(12) United States Patent
Tatara et al.

(10) Patent No.: US 10,906,453 B2
(45) Date of Patent: Feb. 2, 2021

(54) VEHICULAR DETECTION DEVICE AND VEHICULAR LAMP

(71) Applicant: KOITO MANUFACTURING CO., LTD., Tokyo (JP)

(72) Inventors: Naoki Tatara, Shizuoka (JP); Toshihiro Okamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/330,840

(22) PCT Filed: Aug. 16, 2017

(86) PCT No.: PCT/JP2017/029455
§ 371 (c)(1),
(2) Date: Mar. 6, 2019

(87) PCT Pub. No.: WO2018/047594
PCT Pub. Date: Mar. 15, 2018

(65) Prior Publication Data
US 2019/0217779 A1    Jul. 18, 2019

(30) Foreign Application Priority Data

Sep. 6, 2016  (JP) ................................. 2016-173884

(51) Int. Cl.
*B60Q 1/24* (2006.01)
*B60Q 1/00* (2006.01)
(Continued)

(52) U.S. Cl.
CPC ............. *B60Q 1/24* (2013.01); *B60Q 1/0011* (2013.01); *B60Q 1/0023* (2013.01); *B60Q 1/04* (2013.01);
(Continued)

(58) Field of Classification Search
CPC .......... B60R 2300/10; B60R 2300/802; B60R 2300/8046; B60R 2300/806; B60Q 1/0023; B60Q 1/0011
See application file for complete search history.

(56) References Cited

U.S. PATENT DOCUMENTS 3,736,416 A * 5/1973 Goodwin ............. B60Q 1/0023
362/276
2005/0180149 A1* 8/2005 Albou .................. B60Q 1/0023
362/459
(Continued)

FOREIGN PATENT DOCUMENTS

DE        10058903 A1   4/2002
DE    102013107263 A1   1/2015
(Continued)

OTHER PUBLICATIONS

English-language machine translation of JP H10-272985-A (Year: 2019).*
(Continued)

*Primary Examiner* — David N Werner
(74) *Attorney, Agent, or Firm* — Osha Bergman Watanabe & Burton LLP

(57) ABSTRACT

A vehicular detection device configured to be mounted to at least one of a right or a left side of a vehicle body includes a detection unit configured to detect an object. An outermost part of the vehicular detection device in a right and left direction is flush with or more inward than an outer surface of a side surface part of the vehicle body in the right and left direction.

18 Claims, 14 Drawing Sheets

(51) Int. Cl.

| | | |
|---|---|---|
| *B60Q 1/26* | (2006.01) | |
| *B60Q 1/04* | (2006.01) | |
| *B60Q 1/32* | (2006.01) | |
| *B60Q 1/46* | (2006.01) | |
| *B60Q 1/50* | (2006.01) | |
| *B60R 11/04* | (2006.01) | |
| *B60R 1/00* | (2006.01) | |

(52) U.S. Cl.
CPC ............ *B60Q 1/0408* (2013.01); *B60Q 1/26* (2013.01); *B60Q 1/2661* (2013.01); *B60Q 1/32* (2013.01); *B60Q 1/46* (2013.01); *B60Q 1/50* (2013.01); *B60R 1/00* (2013.01); *B60R 11/04* (2013.01); *B60R 2300/10* (2013.01); *B60R 2300/103* (2013.01); *B60R 2300/20* (2013.01); *B60R 2300/80* (2013.01)

(56) References Cited

U.S. PATENT DOCUMENTS

| | | | |
|---|---|---|---|
| 2007/0025596 A1 | 2/2007 | Ravier et al. | |
| 2009/0115631 A1* | 5/2009 | Foote | F21V 23/0464 340/901 |
| 2009/0295906 A1* | 12/2009 | Kushimoto | H04N 5/33 348/36 |
| 2012/0229645 A1* | 9/2012 | Yamada | B60Q 1/32 348/148 |
| 2015/0329047 A1* | 11/2015 | Park | B60R 1/12 340/435 |
| 2015/0343950 A1* | 12/2015 | Heinemann | B60R 1/00 348/148 |
| 2017/0129402 A1* | 5/2017 | Low | H04N 5/2256 |
| 2017/0217369 A1* | 8/2017 | Endo | H04N 5/247 |
| 2018/0264990 A1* | 9/2018 | Mouri | F21S 45/47 |
| 2018/0319320 A1* | 11/2018 | Tatara | F21S 41/68 |

FOREIGN PATENT DOCUMENTS

| | | |
|---|---|---|
| EP | 1762428 A1 | 3/2007 |
| JP | H10-272985 A | 10/1998 |
| JP | 2009-181763 A | 8/2009 |
| JP | 2010-13824 A | 1/2010 |
| JP | 2011-184030 A | 9/2011 |
| JP | 2014-122542 A | 7/2014 |
| JP | 2016-37110 A | 3/2016 |

OTHER PUBLICATIONS

International Search Report issued in Application No. PCT/JP2017/029455, dated Nov. 14, 2017 (6 pages).
Written Opinion issued in International Application No. PCT/JP2017/029455, dated Nov. 14, 2017 (5 pages).
Extended European Search Report issued in corresponding European Application No. 17848537.1, dated Feb. 5, 2020 (8 pages).
Office Action issued in European Application No. 17848537.1; dated Sep. 21, 2020 (4 pages).

* cited by examiner

VEHICULAR DETECTION DEVICE AND VEHICULAR LAMP

CROSS-REFERENCE TO RELATED APPLICATIONS

The present application is a national stage application of PCT Application No. PCT/JP2017/029455 filed Aug. 16, 2017, and claims priority to Japanese Patent Application No. 2016-173884 filed on Sep. 6, 2016, the contents of which are incorporated herein by reference in their entirety.

BACKGROUND

Technical Field

The present invention relates to a vehicular detection device including a detection unit configured to detect an object, and a vehicular lamp.

[Patent Document 1] Japanese Patent Application Laid-Open Publication No. 2011-184030

Related Art

A vehicular detection device has been known in which a camera module configured to capture a predetermined area is disposed as a detection unit in an outer casing configured by a cover and a housing (for example, refer to Patent Document 1). Also, there is a vehicular detection device functioning as a vehicular lamp.

The vehicular detection device is used with being mounted to each of right and left sides of a vehicle body, for example. Areas ranging from the rear to sides are captured by the detection units, and captured images are displayed on screens of displays disposed in a vehicle interior.

A driver can perceive situations from the rear to the sides and drive a vehicle in correspondence to the perceived situations by visually recognizing the left and right images displayed on the screens of the displays.

Since the vehicular detection devices are provided to capture the areas from the rear to the sides, it is possible to manufacture a vehicle with no side-view mirror.

In the vehicular detection device disclosed in Patent Document 1, the detection unit is disposed in a space surrounded by a chassis and a cover, and the chassis is mounted to an outer surface of a side surface part of the vehicle body.

SUMMARY OF INVENTION

In the vehicular detection device disclosed in Patent Document 1, the chassis is mounted to the outer surface of the side surface part of the vehicle body and is entirely disposed at a position protruding outward from the side surface part.

Therefore, the vehicular detection device may contact a wall and the like during traveling on a narrow road, for example, and detection performance may be thus lowered or lost due to damage resulting from the contact.

Also, since the vehicular detection device is disposed at the position protruding outward from the side surface part, a wind resistance increases due to the vehicular detection device during the traveling of the vehicle, which brings obstacles to improvement on fuel efficiency.

Therefore, a vehicular detection device and a vehicular lamp according to one or more embodiments of the present invention reduce occurrence of damage by making it difficult for the vehicular detection device to contact other objects, and improve fuel efficiency of a vehicle.

As a first aspect, a vehicular detection device according to one or more embodiments of the present invention is a vehicular detection device configured to be mounted to at least one of a right or a left side of a vehicle body and includes a detection unit configured to detect an object. An outermost part of the vehicular detection device in a right and left direction is flush with or more inward than an outer surface of a side surface part of the vehicle body in the right and left direction.

Thereby, there is no part protruding outward from the outer surface of the side surface part of the vehicle body.

As a second aspect, in the vehicular detection device according to one or more embodiments of the present invention, it is preferable that at least a part of a surface of the vehicular detection device located at an outer side in the right and left direction is flush with the outer surface.

Thereby, a concave portion relative to the side surface part does not exist in a provision region of the vehicular detection device or is small even though it exists. Therefore, the wind passing the outer side of the side surface part during traveling of the vehicle is difficult to enter an inner side of the side surface part.

As a third aspect, in the vehicular detection device according to one or more embodiments of the present invention, it is preferable that an entire surface of the vehicular detection device located at the outer side in the right and left direction is flush with the outer surface.

Thereby, since a concave portion relative to the side surface part does not exist in the provision region of the vehicular detection device, the wind passing the outer side of the side surface part during traveling of the vehicle does not enter the inner side of the side surface part.

As a fourth aspect, in the vehicular detection device according to one or more embodiments of the present invention, it is preferable that a light source configured to emit light is disposed.

Thereby, the light source is disposed in the vehicular detection device, in addition to the detection unit.

As a fifth aspect, in the vehicular detection device according to one or more embodiments of the present invention, it is preferable that a light shielding part is formed between the detection unit and the light source.

Thereby, detection light to be incident on the detection unit and illumination light to be emitted from the light source are shielded by the light shielding part, so that the lights do not influence each other.

As a sixth aspect, in the vehicular detection device according to one or more embodiments of the present invention, it is preferable that a prism through which detection light incident on the detection unit is to pass is disposed, and an outermost part of the prism in the right and left direction is flush with the outer surface in the right and left direction.

Thereby, the detection light passes through the prism of which a part is flush with the outer surface of the side surface part.

As a seventh aspect, a vehicular lamp according to one or more embodiments of the present invention is a vehicular lamp configured to be mounted to at least one of a right or a left sides of a vehicle body and includes a detection unit configured to detect an object and a light source configured to emit light. An outermost part of the vehicular lamp in a right and left direction is flush with or more inward than an outer surface of a side surface part of the vehicle body in the right and left direction.

Thereby, there is no part protruding outward from the outer surface of the side surface part of the vehicle body.

According to according to one or more embodiments of the present invention, there is no part protruding outward from the outer surface of the side surface part of the vehicle body. Accordingly, it is possible to reduce occurrence of damage by making it difficult for the vehicular detection device to contact other objects, and to improve the fuel efficiency of the vehicle.

DETAILED DESCRIPTION

Hereinafter, embodiments for implementing the present invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more of the embodiments, a vehicular detection device is applied to a side turn signal lamp functioning as a vehicular lamp, too. In the meantime, the vehicular detection device (vehicular lamp) according to one or more embodiments of the present invention is not limited to the side turn signal lamp, and can be widely applied to diverse lamps such as a headlamp, a clearance lamp, a tail lamp, a turn signal lamp, a stop lamp, a daytime running lamp, a cornering lamp, a hazard lamp, a position lamp, a back lamp, a fog lamp, a high-mount stop lamp, a foot lamp, a combination lamp thereof and the like inasmuch as a detection unit is disposed therein.

In the meantime, one or more embodiments of the present invention can be applied to a vehicular detection device, too, which does not function as the vehicular lamp. In this case, the detection unit is provided but a light source is not provided.

<Outline of Vehicle>

Figure 1:
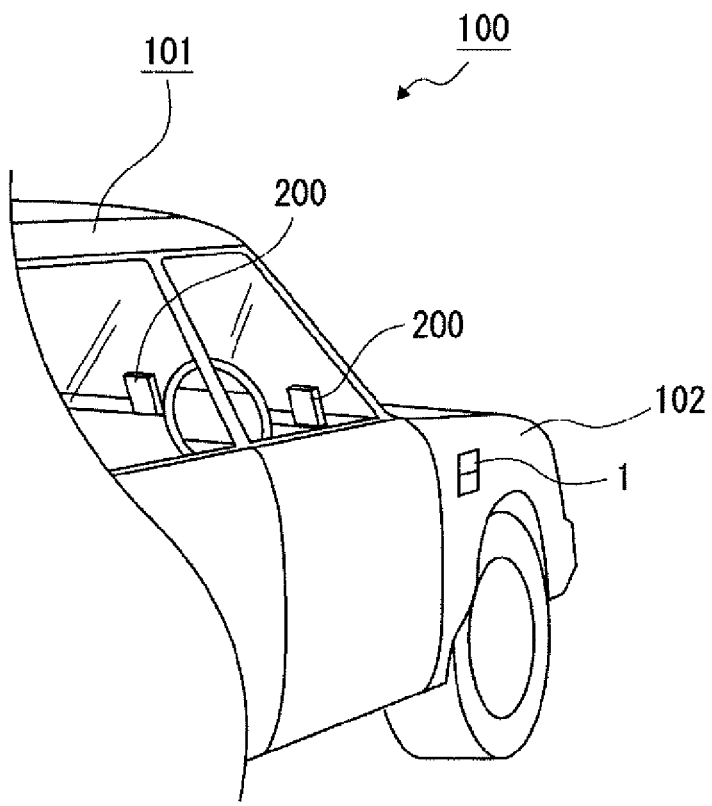
FIG. 1 is a perspective view of a vehicle, depicting one or more embodiments of the present invention together with FIGS. 2 to 27.

Vehicular detection devices 1, 1 are respectively mounted to side surface parts 102, 102 of right and left sides of a vehicle body 101 of a vehicle 100 (refer to FIG. 1). In the meantime, the vehicular detection device 1 may be mounted to one side surface part 102.

The vehicular detection device 1 is configured to function as a vehicular lamp, too, and can capture, for example, an area ranging from a rear to a side of the vehicle 100 by a detection unit, which will be described later. The images (video picture) captured by the detection units are displayed on respective screens of displays 200, 200 disposed in a vehicle interior. On the respective screens of the displays 200, 200, a left image and a right image are respectively displayed. On the other hand, in the vehicle interior, one display 200 may be provided, and the display 200 may be provided with two screens on which a left image and a right image are to be respectively displayed.

A driver can perceive situations from the rear to the sides and drive a vehicle in correspondence to the perceived situations by visually recognizing the left and right images displayed on the respective screens of the displays 200, 200.

Like this, since the vehicular detection devices 1, 1 can capture the areas from the rear to the sides of the vehicle 100, the vehicle 100 is not provided with side-view mirrors and is thus made smaller.

In the meantime, the detection unit may be a camera module having a capturing function, other capturing device having a capturing function, or a radar, a sensor or the like having a detection function, and any configuration can be used inasmuch as it is possible to detect an object.

An outermost part of the vehicular detection device 1 in a right and left direction or at least a part of a surface located at an outer side in the right and left direction is flush with or more inward than an outer surface 102a of a side surface part 102 of the vehicle body 101 in the right and left direction.

<Embodiments of Vehicular Detection Device>

In the below, each embodiment of the vehicular detection device is described.

Meanwhile, in the below, the vehicular detection device 1 mounted to the right side surface part 102 of the vehicle 100 is exemplified. The vehicular detection device 1 mounted to the left side surface part 102 of the vehicle 100 is bilaterally symmetric to the vehicular detection device 1 mounted to the right side surface part 102 of the vehicle 100.

<First Embodiment>

Figure 2:
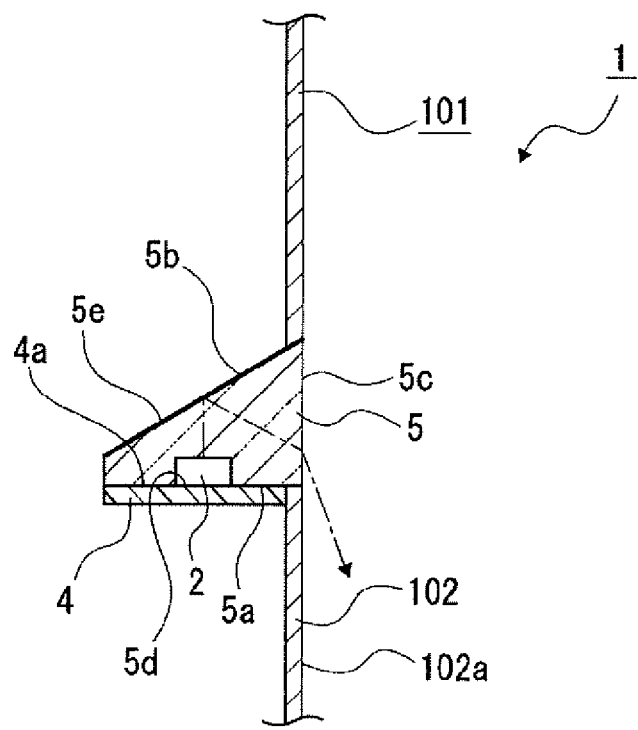
FIG. 2 is a sectional view of a vehicular detection device of a first embodiment.
Figure 3:
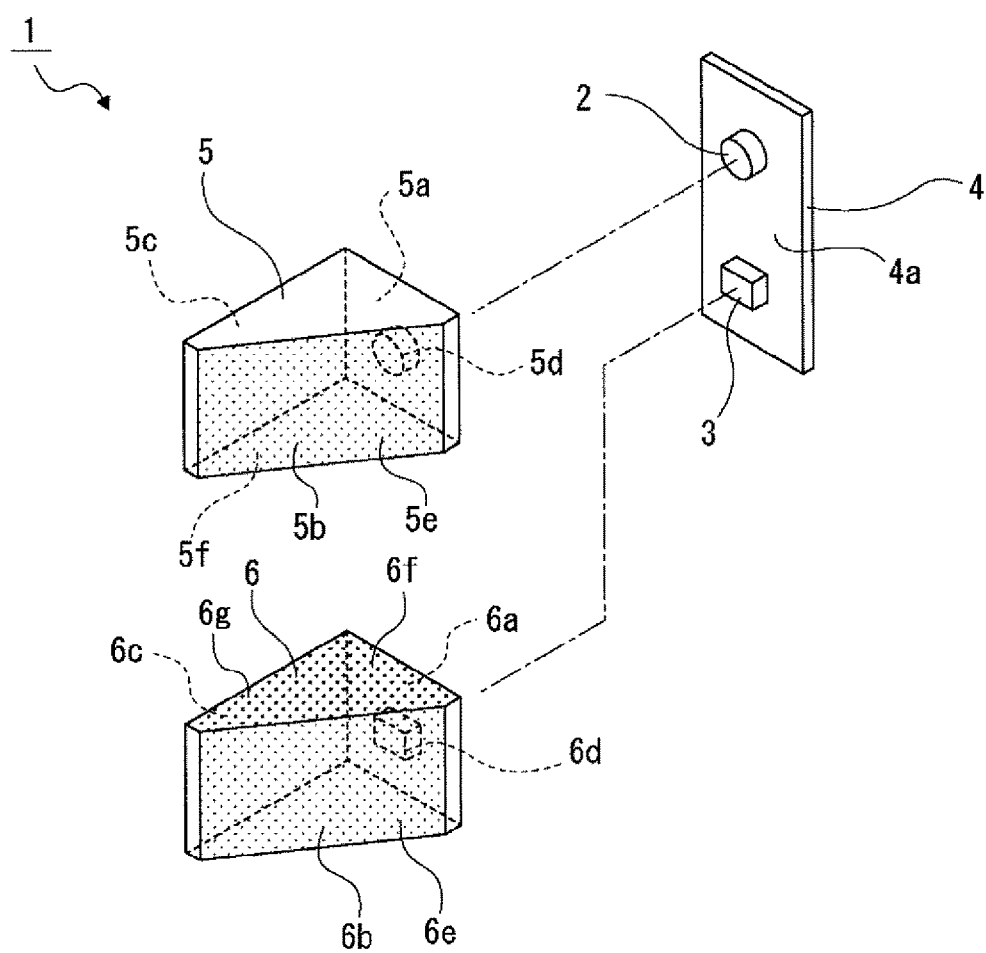
FIG. 3 is an exploded perspective view of the vehicular detection device of the first embodiment.

First, the vehicular detection device 1 of a first embodiment is described (refer to FIGS. 2 and 3).

The vehicular detection device 1 includes a detection unit 2 and a light source 3, and the detection unit 2 and the light source 3 are disposed with being spaced in an upper and lower direction. The detection unit 2 and the light source 3 are mounted on a front surface 4a of a substrate 4 having a vertically long shape. A prism for detection 5 and a prism for illumination 6 are mounted side by side in the upper and lower direction on the front surface 4a of the substrate 4. As the detection unit 2, for example, a camera module is used, and as the light source 3, for example, a light emitting diode (LED) is used.

The prism for detection 5 has a first surface 5a, a second surface 5b and a third surface 5c, which are circumferential surfaces except upper and lower surfaces, and the first surface 5a is mounted with being in contact with the front surface 4a of the substrate 4. The prism for detection 5 is formed with a concave portion for placement 5d opened to the first surface 5a. In a state where the prism for detection 5 is mounted to the substrate 4, the detection unit 2 is placed in the concave portion for placement 5d.

The prism for illumination 6 has the same size and shape as the prism for detection 5, and has a first surface 6a, a second surface 6b and a third surface 6c, which are circumferential surfaces, and the first surface 6a is mounted with being in contact with the front surface 4a of the substrate 4. The prism for illumination 6 is formed with a concave portion for placement 6d opened to the first surface 6a. In a state where the prism for illumination 6 is mounted to the substrate 4, the light source 3 is placed in the concave portion for placement 6d.

The second surface 5b of the prism for detection 5 and the second surface 6b of the prism for illumination 6 are formed with reflection portions 5e, 6e by vapor deposition, for example.

An upper surface 6f of the prism for illumination 6 is colored with black, for example, so that a light shielding part 6g is formed. The prism for illumination 6 is disposed in a state where the upper surface 6f is in contact with the lower surface 5f of the prism for detection 5. Therefore, the light shielding part 6g is located between the detection unit 2 and the light source 3.

Since the light shielding part 6g is located between the detection unit 2 and the light source 3 in this way, detection light incident on the detection unit 2 and illumination light emitted from the light source 3 are shielded by the light shielding part 6g, so that the lights do not influence each other, and it is thus possible to secure favorable detection performance by the detection unit 2 and favorable illumination state by the light source 3.

On the other hand, the light shielding part may be formed on the lower surface 5f of the prism for detection 5, instead of the upper surface 6f of the prism for illumination 6.

In the vehicular detection device 1, the third surface 5c of the prism for detection 5 and the third surface 6c of the prism for illumination 6 are flush with the outer surface 102a of the side surface part 102 of the vehicle body 101. Also, the reflection portion 5e of the prism for detection 5 and the reflection portion 6e of the prism for illumination 6 are inclined in the right and left direction with respect to the front and rear direction.

In the vehicular detection device 1 configured as described above, the detection light is incident on the detection unit 2 via the prism for detection 5, so that the area ranging from the rear to the side of the vehicle 100 is captured by the detection unit 2. At this time, the detection light is incident from the third surface 5c of the prism for detection 5, is reflected on the reflection portion 5e and is then incident on the detection unit 2. When the detection light is incident from the third surface 5c, the detection light is refracted and is then incident on the prism for detection 5.

Also, when the illumination light is emitted from the light source 3, the emitted illumination light is reflected on the reflection portion 6e of the prism for illumination 6 and is irradiated via the third surface 6c, so that the area ranging from the rear to the side of the vehicle 100 is illuminated. When the illumination light is emitted from the third surface 6c, the illumination light is refracted and is then emitted toward an outside.

As described above, in the vehicular detection device 1, the third surfaces 5c, 6c of the prism for detection 5 and the prism for illumination 6, which are located at the outermost sides in the right and left direction, are flush with the outer surface 102a of the side surface part 102.

Therefore, since the detection light and the illumination light pass through the prism for detection 5 and the prism for illumination 6, which are partially flush with the outer surface 102a, it is possible to easily control light paths of the detection light and the illumination light while making it difficult for the vehicular detection device to contact the other object.

Also, like the vehicular detection device 1, as the means for controlling the detection light and the illumination light, the prism for detection 5 and the prism for illumination 6 are used, so that it is possible to refract the incident light and the emission light.

Therefore, even when the detection unit 2 and the light source 3 are disposed more inward than the outer surface 102a of the side surface part 102, it is possible to easily detect objects existing in the area ranging from the side to the rear, to easily illuminate the area ranging from the side to the rear, and to easily control the lights without projecting the vehicular detection device 1 outward from the outer surface 102a.

Also, when using the prism for detection 5 and the prism for illumination 6, as the means for controlling the detection light and the illumination light, a reflection treatment for reflecting light is preferably implemented for parts of the prism for detection 5 and the prism for illumination 6. Also, it is not necessary to provide a reflection member such as a reflector, and a cover or housing for covering the same, so that it is possible to save the manufacturing cost by reduction in the number of components.

Figure 4:
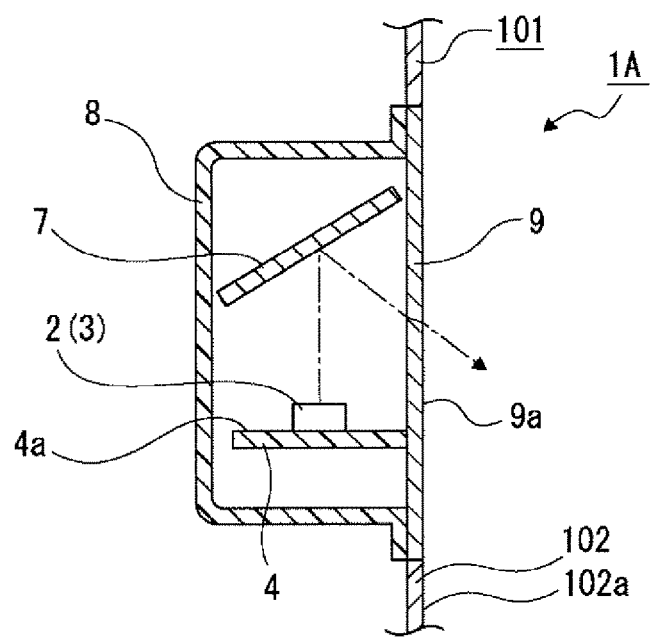
FIG. 4 is a sectional view depicting a modified embodiment of the vehicular detection device of the first embodiment.

In the meantime, as a modified embodiment of the vehicular detection device 1, for example, a vehicular detection device 1A having reflectors 7, 7 may be used (refer to FIG. 4). The vehicular detection device 1A has a housing 8 and a cover 9 for disposing therein the reflector 7. In an internal space configured by the housing 8 and the cover 9, the detection unit 2, the light source 3 and the substrate 4 are also disposed in addition to the reflectors 7, 7.

The reflectors 7, 7 are disposed with being spaced in the upper and lower direction, one has a function of reflecting the detection light and the other has a function of reflecting the illumination light, and both the reflectors are located in a direction inclined in the right and left direction with respect to the front and rear direction.

The housing 8 has an opened side. The cover 9 has a flat plate shape, and an outer surface 9a thereof is flush with the outer surface 102a of the side surface part 102.

<Second Embodiment>

Figure 5:
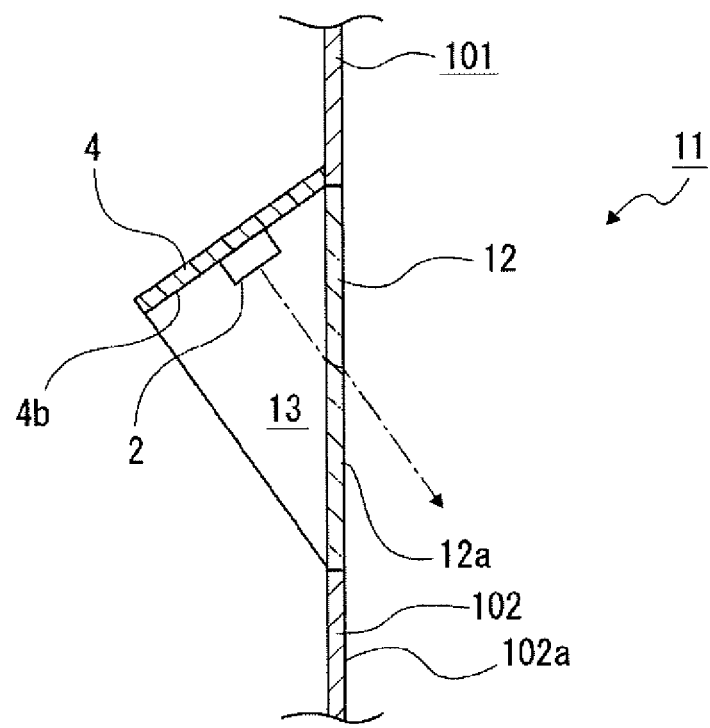
FIG. 5 is a sectional view of a vehicular detection device of a second embodiment.
Figure 6:
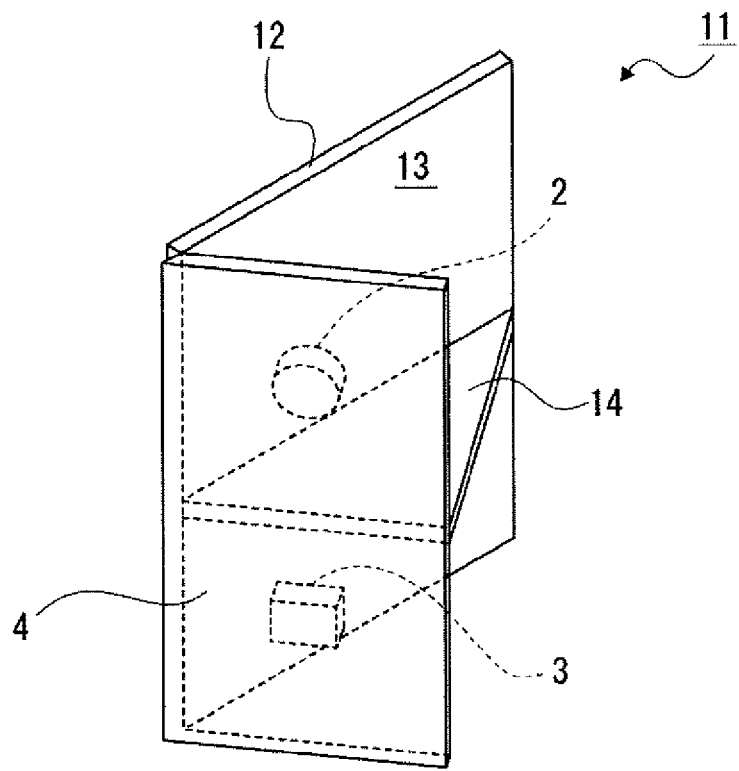
FIG. 6 is a perspective view of the vehicular detection device of the second embodiment.

Subsequently, a vehicular detection device 11 of a second embodiment is described (refer to FIGS. 5 and 6).

The vehicular detection device 11 includes the detection unit 2 and the light source 3, and the detection unit 2 and the light source 3 are disposed with being spaced in the upper and lower direction. The detection unit 2 and the light source 3 are mounted on a rear surface 4b of the substrate 4 that is long vertically. The substrate 4 is inclined so that the rear surface 4b is directed slightly outward in the right and left direction.

A cover 12 is attached to an outer end portion of the rear surface 4b of the substrate 4 in the right and left direction. The cover 12 is formed of a transparent material, has a plate shape facing in the right and left direction, and is attached at a front end portion to the end portion of the substrate 4.

A space is formed between the substrate 4 and the cover 12, as a space for placement 13. In the space for placement 13, the detection unit 2 and the light source 3 are disposed.

In the space for placement 13, a light shielding plate 14 facing in the upper and lower direction is disposed between the detection unit 2 and the light source 3.

In this way, since the light shielding plate 14 is located between the detection unit 2 and the light source 3, the detection light incident on the detection unit 2 and the illumination light emitted from the light source 3 are shielded by the light shielding plate 14, so that the lights do not influence each other, and it is thus possible to secure the favorable detection performance by the detection unit 2 and the favorable illumination state by the light source 3.

In the vehicular detection device 11, an outer surface 12a of the cover 12 is flush with the outer surface 102a of the side surface part 102 of the vehicle body 101.

In the vehicular detection device 11 configured as described above, the detection light is incident on the detection unit 2 via the cover 12, so that the area ranging from the rear to the side of the vehicle 100 is captured by the detection unit 2.

Also, when the illumination light is emitted from the light source 3, the emitted illumination light is irradiated via the cover 12, so that the area ranging from the rear to the side of the vehicle 100 is illuminated.

As described above, in the vehicular detection device 11, the outer surface 12a of the cover 12 is flush with the outer surface 102a of the side surface part 102.

Therefore, it is possible to secure the favorable detection performance and illumination performance while making it difficult for the vehicular detection device to contact the other object.

The example where the vehicular detection device 11 is provided with the cover 12 has been described. However, also in the vehicular detection device 11, like the vehicular detection device 1, the prism may be provided, instead of the cover 12.

<Third Embodiment>

Figure 7:
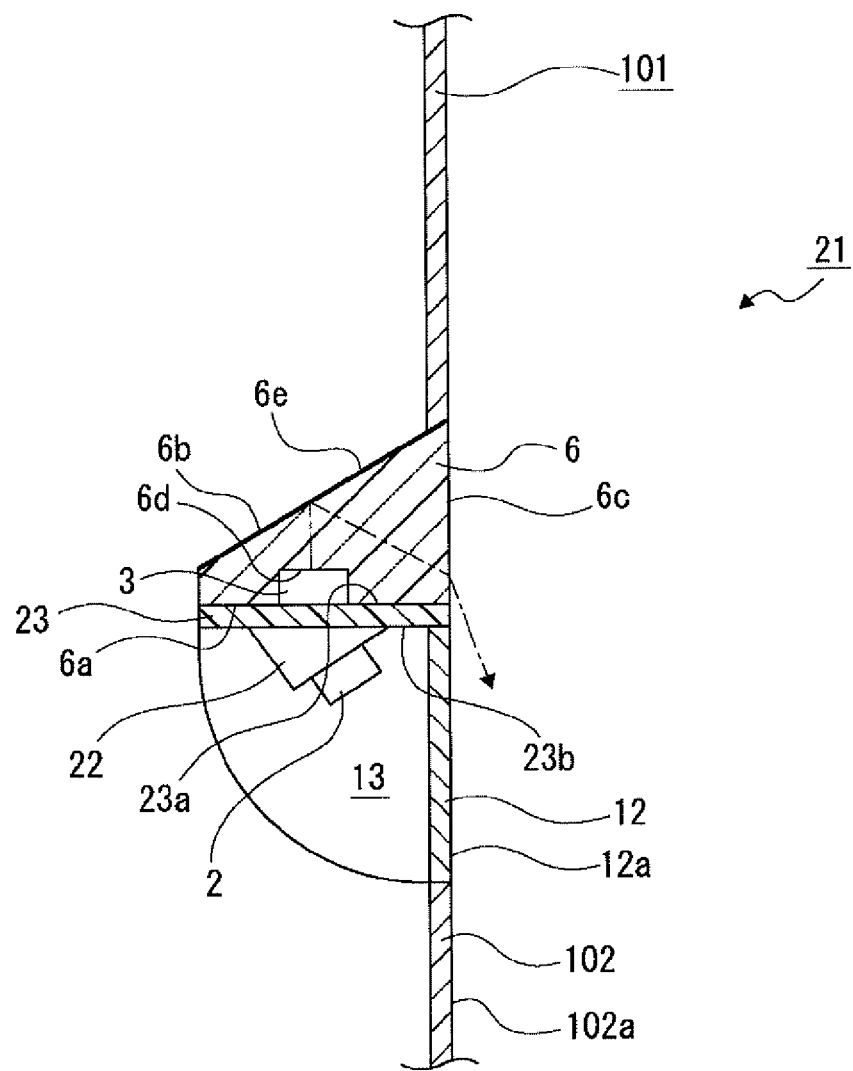
FIG. 7 is a sectional view of a vehicular detection device of a third embodiment.

Subsequently, a vehicular detection device 21 of a third embodiment is described (refer to FIG. 7).

The vehicular detection device 21 includes the detection unit 2 and the light source 3, and the light source 3 and the detection unit 2 are disposed with being spaced in the front and rear direction. The detection unit 2 and the light source 3 are mounted on a substrate 23, which is a both-sided surface facing in the front and rear direction, the light source 3 is mounted on a front surface 23a of the substrate 23, and the detection unit 2 is mounted on a rear surface 23b of the substrate 23 via a bracket 22.

The prism for illumination 6 is mounted on the front surface 23a of the substrate 23.

The prism for illumination 6 is mounted with the first surface 6a being in contact with the front surface 23a of the substrate 23. The light source 3 is placed in the concave portion for placement 6d of the prism for illumination 6.

The cover 12 is attached to an outer end portion of the rear surface 23b of the substrate 23 in the right and left direction. The cover 12 is formed of a transparent material, has a plate shape facing in the right and left direction and, and is attached at a front end face to the rear surface 23b of the substrate 23. An internal space of the cover 12 is formed as the space for placement 13. In the space for placement 13, the light source 3 and the bracket 22 are disposed.

In the vehicular detection device 21, the third surface 6c of the prism for illumination 6 and the outer surface 12a of the cover 12 are flush with the outer surface 102a of the side surface part 102, and one side surface of the substrate 23 is also flush with the outer surface 102a.

In the vehicular detection device 21 configured as described above, the detection light is incident on the detection unit 2 via the cover 12, so that the area ranging from the rear to the side of the vehicle 100 is captured by the detection unit 2.

Also, when the illumination light is emitted from the light source 3, the emitted illumination light is reflected on the reflection portion 6e of the prism for illumination 6, and is irradiated via the third surface 6c, so that the area ranging from the rear to the side of the vehicle 100 is illuminated. When the illumination light is emitted from the third surface 6c, the illumination light is refracted and is then emitted toward the outside.

As described above, in the vehicular detection device 21, the third surface 6c of the prism for illumination 6, which is located at the outermost side in the right and left direction, the outer surface 12a of the cover 12 and one side surface of the substrate 23 are flush with the outer surface 102a of the side surface part 102.

Therefore, it is possible to secure the favorable detection performance and illumination performance while making it difficult for the vehicular detection device to contact the other object.

Also, like the vehicular detection device 21, the prism for illumination 6 is used as the means for controlling the illumination light, so that it is possible to refract the emission light. Also, even when the light source 3 is disposed more inward than the outer surface 102a of the side surface part 102, it is possible to easily illuminate the area ranging from the side to the rear, and to easily control the lights without projecting the vehicular detection device 21 outward from the outer surface 102a.

Also, when the prism for illumination 6 is used as the means for controlling the illumination light, a reflection treatment for reflecting light is preferably implemented for a part of the prism for illumination 6. Also, it is not necessary to provide a reflection member such as a reflector, and a cover or housing for covering the same, so that it is possible to save the manufacturing cost by reduction in the number of components.

Meanwhile, also in the vehicular detection device 21, like the vehicular detection device 1, the prism for illumination may be provided instead of the cover 12.

Also, in the vehicular detection device 21, since the detection unit 2 and the light source 3 are respectively mounted on both the surfaces of the substrate 23, the substrate 23 functions as the light shielding part of the detection light to be incident on the detection unit 2 and the illumination light to be emitted from the light source 3. Therefore, it is not necessary to provide a dedicated light shielding part for shielding the detection light and the illumination light, so that while reducing the number of components and saving the manufacturing cost, it is possible to prevent the detection light and the illumination light from influencing each other.

<Fourth Embodiment>

Subsequently, a vehicular detection device 31 of a fourth embodiment is described (refer to FIGS. 8 and 9).

The vehicular detection device 31 includes the detection unit 2 and the light source 3, and the light source 3 and the detection unit 2 are disposed with being spaced in the front and rear direction.

The vehicular detection device 31 is provided with a housing 32 having a W-shaped horizontal section, as seen from a lateral direction, and opened laterally (outward), and the housing 32 has a first surface portion 32a, a second surface portion 32b, a third surface portion 32c and a fourth surface portion 32d in order from the front side, which are continuous and are inclined alternately in opposite directions in the right and left direction. The first surface portion 32a, the second surface portion 32b, the third surface portion 32c and the fourth surface portion 32d form the W-shaped part.

The detection unit 2 is mounted to the third surface portion 32c via the bracket 22, and the light source 3 is mounted to the first surface portion 32a via a substrate 33.

A cover 34 is attached to the housing 32 with covering the opening. The cover 34 is formed of a transparent material, has a substantially flat plate shape facing in the right and left direction, and has lens steps 35, 35, . . . formed on an inner surface of a part located at a side of the first surface portion 32a and the second surface portion 32b. The lens step 35 has a curved shape where an incidence surface 35a is concave inward, for example (refer to FIG. 9).

Figure 8:
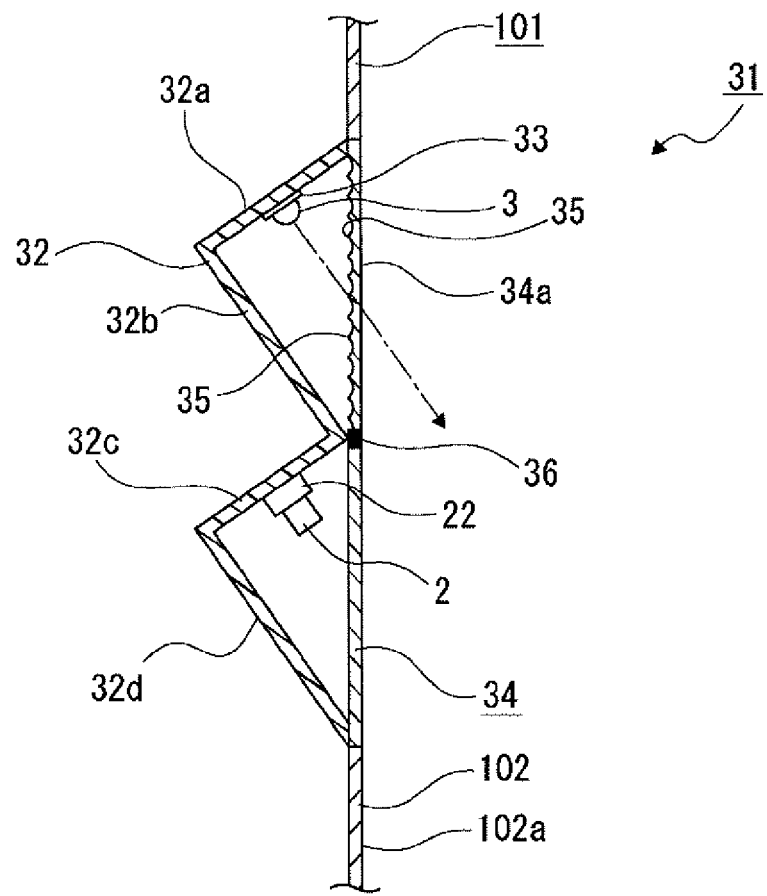
FIG. 8 is a sectional view of a vehicular detection device of a fourth embodiment.
Figure 9:
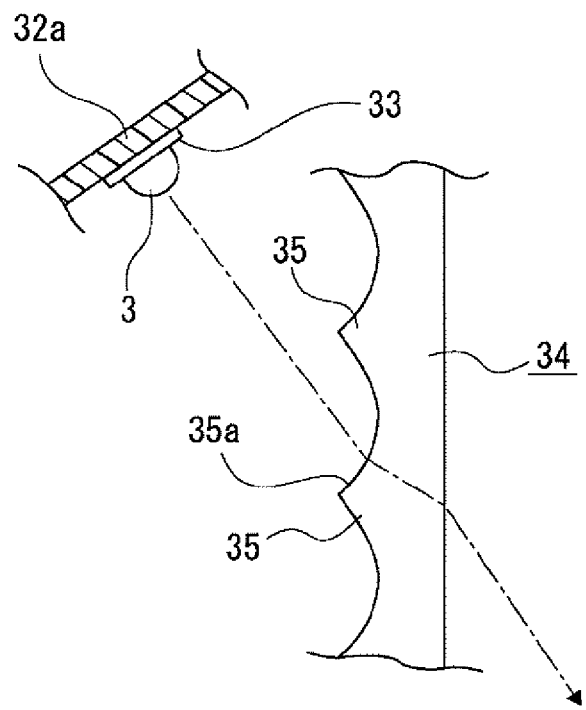
FIG. 9 depicts a light path of illumination light in the vehicular detection device of the fourth embodiment.

A central portion of the cover 34 in the front and rear direction is provided with a light shielding part 36 colored with black, for example (refer to FIG. 8).

In the vehicular detection device 31, an outer surface 34a of the cover 34 is flush with the outer surface 102a of the side surface part 102 of the vehicle body 101. The light shielding part 36 of the cover 34 is located with being in contact with a boundary portion between the second surface portion 32b and the third surface portion 32c.

In the vehicular detection device 31 configured as described above, the detection light is incident on the detection unit 2 via the cover 34, so that the area ranging from the rear to the side of the vehicle 100 is captured by the detection unit 2.

Also, when the illumination light is emitted from the light source 3, the emitted illumination light is controlled by the lens steps 35, 35, . . . formed on the cover 34, and is irradiated via the cover 34, so that the area ranging from the rear to the side of the vehicle 100 is illuminated.

At this time, since the incidence surface 35a of the lens step 35 has the curved shape, it is possible to easily perform light distribution control on the illumination light. For example, in a case where two different planes in two directions are continuously formed as the incidence surface, the light incident on a boundary portion between the continuous planes may travel in a direction largely different from the light incident from the other portion of the incidence surface. However, in the case of the incidence surface 35a having the curved shape, there occurs no phenomenon that the traveling of some light is largely different.

Therefore, the incidence surface 35a of the lens step 35 has the curved shape, so that it is possible to easily perform the light distribution control on the illumination light emitted from the light source 3 and to perform the illumination by the uniform light.

As described above, in the vehicular detection device 31, the outer surface 34a of the cover 34 is flush with the outer surface 102a of the side surface part 102.

Therefore, it is possible to secure the favorable detection performance and illumination performance while making it difficult for the vehicular detection device to contact the other object.

Also, since the cover 34 is provided with the light shielding part 36, the detection light incident on the detection unit 2 and the illumination light emitted from the light source 3 are shielded by the light shielding part 36, so that the lights do not influence each other, and it is thus possible to secure the favorable detection performance by the detection unit 2 and the favorable illumination state by the light source 3.

Figure 10:
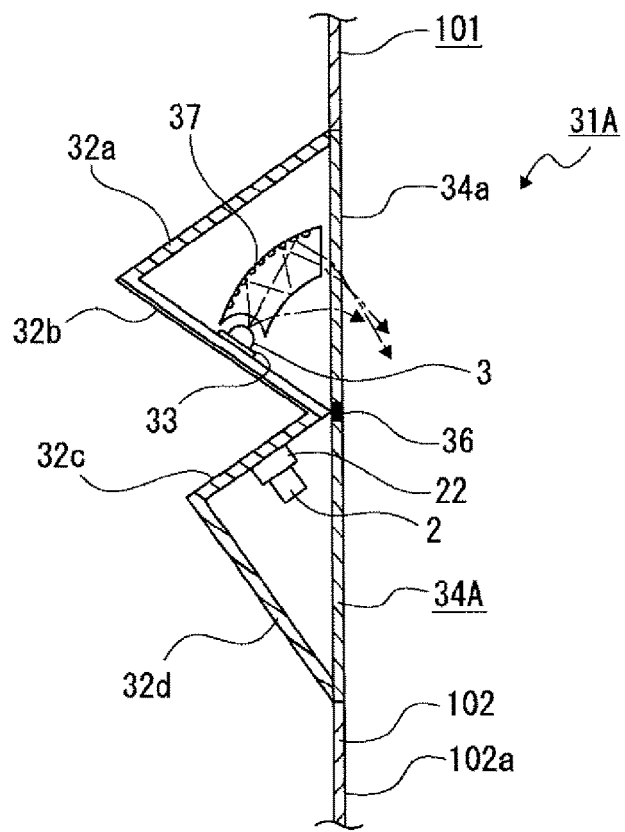
FIG. 10 is a sectional view depicting a modified embodiment of the vehicular detection device of the fourth embodiment.

In the meantime, as a modified embodiment of the vehicular detection device 31, for example, a vehicular detection device 31A having a light guide member 37 instead of the lens steps 35, 35, . . . may be used (refer to FIG. 10).

In the vehicular detection device 31A, a light guide member 37 configured to guide the light to be emitted from the light source 3 is disposed. The light guide member 37 is disposed between the light source 3 and a cover 34A. The light source 3 is mounted on the second surface portion 32b of the housing 32.

In the vehicular detection device 31A, when the illumination light is emitted from the light source 3, the emitted illumination light is incident on the light guide member 37, is guided toward the cover 34A by the light guide member 37, is emitted from the light guide member 37 and is irradiated via the cover 34A, so that the area ranging from the rear to the side of the vehicle 100 is illuminated.

In the vehicular detection device 31A, since the illumination light is guided by the light guide member 37, it is possible to freely control a traveling direction of the light by the light guide member 37, and a range of choice for the mounting position of the light source 3 is widened to improve a degree of freedom of design.

On the other hand, also in the vehicular detection device 31A, like the vehicular detection device 31, the cover 34A may be formed with the lens steps.

Figure 11:
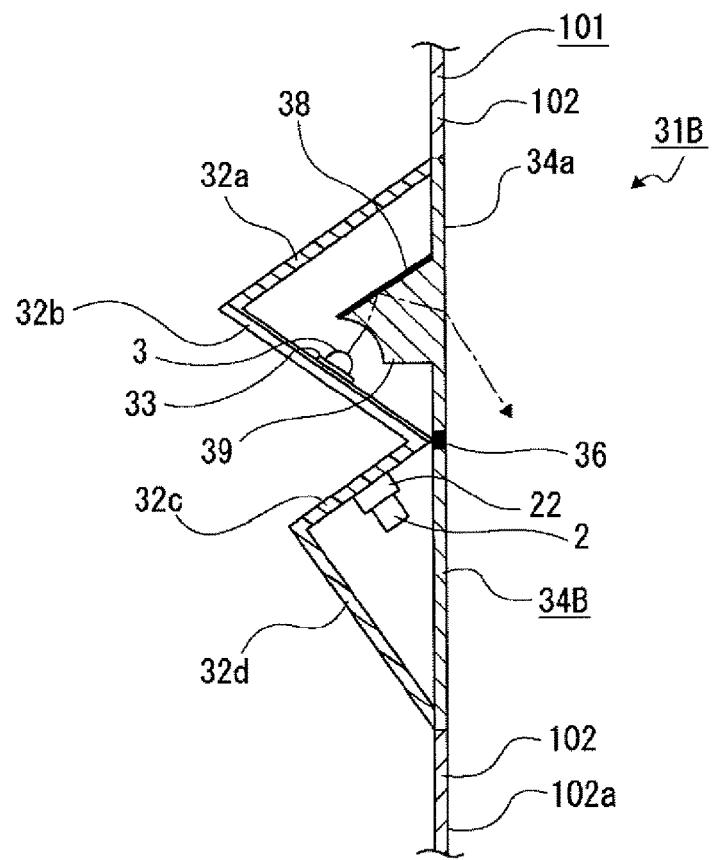
FIG. 11 is a sectional view depicting another modified embodiment of the vehicular detection device of the fourth embodiment.

Also, as a modified embodiment of the vehicular detection device 31, for example, a vehicular detection device 31B having a reflection portion 38 instead of the lens steps 35, 35, . . . may be used (refer to FIG. 11).

In the vehicular detection device 31B, a cover 34B is provided with a light incidence part 39 protruding toward the light source 3, and a portion of the light incidence part 39 is formed with a reflection portion 38 configured to reflect the light emitted from the light source 3. The reflection portion 38 is formed by implementing aluminum vapor deposition on a portion of the light incidence part 39, for example. The light source 3 is mounted on the second surface portion 32b of the housing 32.

In the vehicular detection device 31B, when the illumination light is emitted from the light source 3, the emitted illumination light is incident on the light incidence part 39, is reflected on the reflection portion 38 and is irradiated via the cover 34B, so that the area ranging from the rear to the side of the vehicle 100 is illuminated.

In the vehicular detection device 31B, since the illumination light is reflected by the reflection portion 38, it is possible to freely control the traveling direction of the light by a direction and a position of the reflection portion 38, and a range of choice for the mounting position of the light source 3 is widened to improve a degree of freedom of design.

Figure 12:
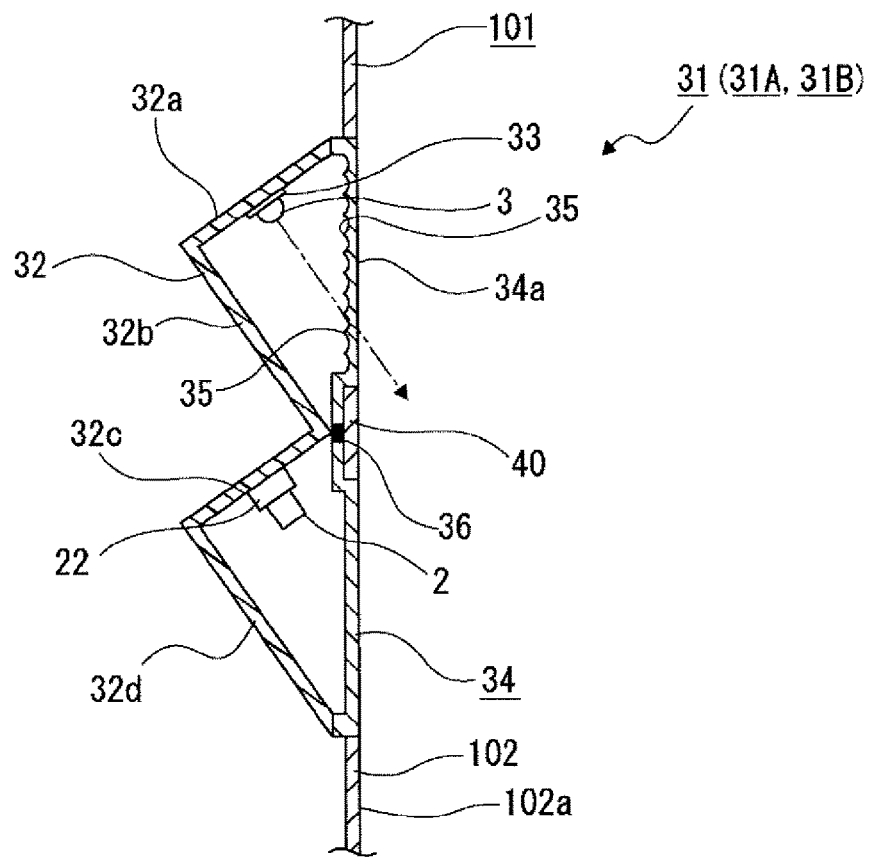
FIG. 12 is a sectional view depicting an example where a screening member is provided to the vehicular detection device of the fourth embodiment.

In the meantime, the vehicular detection device 31; 31A; 31B is provided with the light shielding part 36. However, for example, a part of the cover 34; 34A; 34B may be formed with a concave portion, and a screening member 40 configured to screen the light shielding part 36 may be disposed in the concave portion (refer to FIG. 12).

As the screening member 40, for example, a member having the same color as the side surface part 102 of the vehicle body 101 or a black member may be used. When the screening member 40 is formed to have the same color as the side surface part 102, it is possible to improve the appearance of the vehicle 100.

Figure 13:
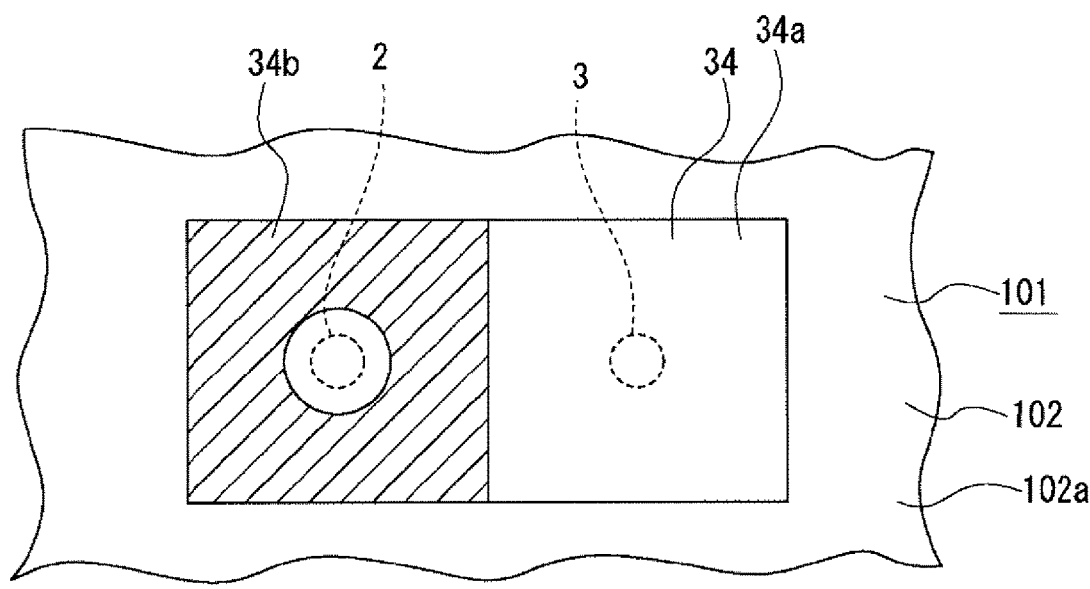
FIG. 13 is a side view depicting an example where a part of a cover is non-transparent in the vehicular detection device of the fourth embodiment.

Also, a portion 34b (a part shown with the hatched lines in FIG. 13) of the rear surface of the cover 34; 34A; 34B except the portion on which the detection light is incident may be provided as a non-transparent portion having the same color as the side surface part 102, black or the like. The non-transparent portion 34b may be formed by forming the cover 34; 34A; 34B with two-color formation or paining the cover 34; 34A; 34B.

The portion 34b of the cover 34, 34A, 34B is provided as the opaque portion, so that it is possible to shield the light or to make screening without using the light shielding part 38 or the screening member 40. Accordingly, it is possible to reduce the number of components and to save the manufacturing cost.

<Fifth Embodiment>

Figure 14:
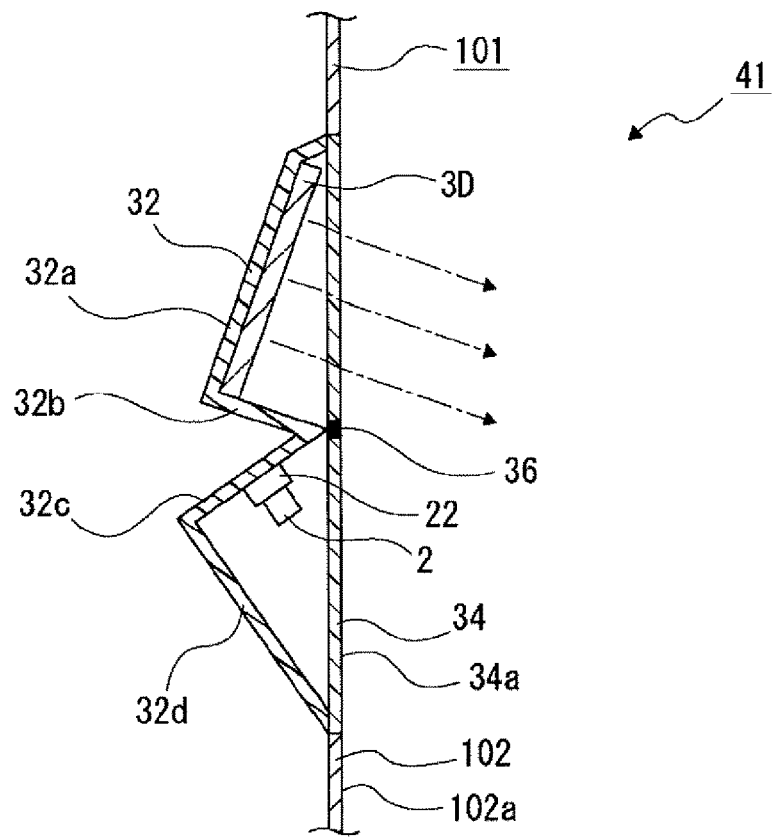
FIG. 14 is a sectional view of a vehicular detection device of a fifth embodiment.

Subsequently, a vehicular detection device 41 of a fifth embodiment is described (refer to FIG. 14).

The vehicular detection device 41 includes the detection unit 2 and a light source 3D, and the light source 3D and the detection unit 2 are disposed with being spaced in the front and rear direction. As the light source 3D, an organic EL (Organic Electro Luminescence) panel is used.

The detection unit 2 is mounted on the third surface portion 32c of the housing 32 via the bracket 22, and the light source 3D is mounted on the first surface portion 32a.

The cover 34 is attached to the housing 32 with covering the opening. A central portion of the cover 34 in the front and rear direction is provided with the light shielding part 36.

In the vehicular detection device 41, the outer surface 34a of the cover 34 is flush with the outer surface 102a of the side surface part 102 of the vehicle body 101. The light shielding part 36 of the cover 34 is located with being in contact with a boundary portion of the second surface portion 32b and the third surface portion 32c.

In the vehicular detection device 41 configured as described above, the detection light is incident on the detection unit 2 via the cover 34, so that the area ranging from the rear to the side of the vehicle 100 is captured by the detection unit 2.

Also, when the illumination light is emitted from the light source 3D, the emitted illumination light is irradiated via the cover 34, so that the area ranging from the rear to the side of the vehicle 100 is illuminated.

As described above, in the vehicular detection device 41, the outer surface 34a of the cover 34 is flush with the outer surface 102a of the side surface part 102.

Therefore, it is possible to secure the favorable detection performance and illumination performance while making it difficult for the vehicular detection device to contact the other object.

Also, since the cover 34 is provided with the light shielding part 36, the detection light incident on the detection unit 2 and the illumination light emitted from the light source 3D are shielded by the light shielding part 36, so that the lights do not influence each other, and it is thus possible to secure the favorable detection performance by the detection unit 2 and the favorable illumination state by the light source 3D.

Also, since the organic EL panel is used as the light source 3D, it is possible to secure a wide irradiation range by the light source 3D, and to use the entire first surface portion 32a as a mounting surface on which the light source 3D is to be mounted, so that it is possible to efficiently use the space.

Figure 15:
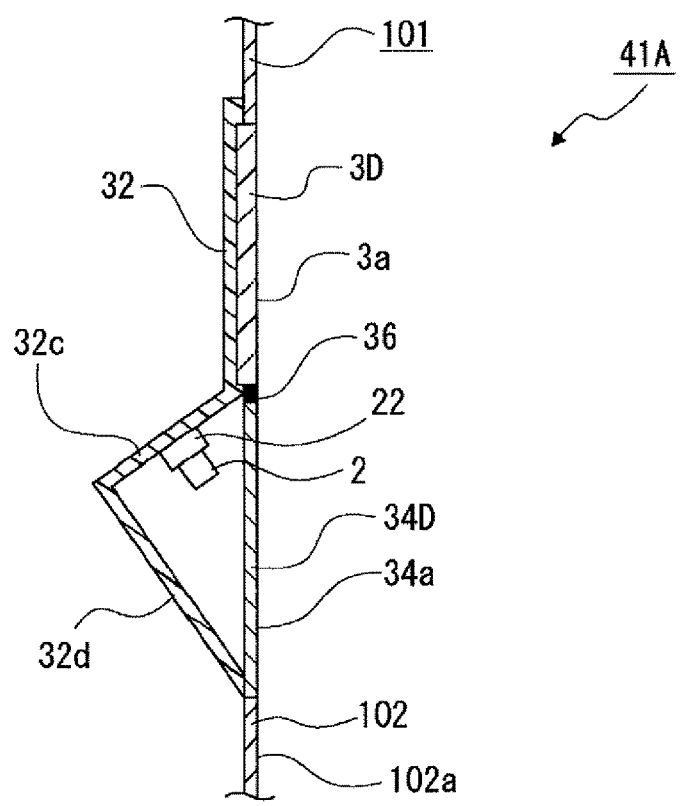
FIG. 15 is a sectional view depicting a modified embodiment of the vehicular detection device of the fifth embodiment.

In the meantime, as a modified embodiment of the vehicular detection device 41, for example, a vehicular detection device 41A in which an outer surface 3a of the light source 3D is flush with the outer surface 102a of the side surface part 102 of the vehicle body 101 may be used (refer to FIG. 15). In the vehicular detection device 41A, since the outer surface 3a of the light source 3D is flush with the outer surface 102a of the side surface part 102, a small cover 34D is disposed only at a side of the third surface portion 32c and the fourth surface portion 32d and the cover 34D and the light source 3D are located with the light shielding part 36 being interposed therebetween.

In the vehicular detection device 41A, since the small cover 34D has only to be used, it is possible to save the manufacturing cost as much as that.

<Sixth Embodiment>

Subsequently, a vehicular detection device 51 of a sixth embodiment is described (refer to FIG. 16).

The vehicular detection device 51 includes the detection unit 2 and the light source 3, and the light source 3 and the detection unit 2 are disposed with being spaced in the front and rear direction.

The vehicular detection device 1 has a housing 52 opened laterally (outward), and the housing 52 has a mounting surface portion 52a facing in the right and left direction and a circumferential surface portion 52b protruding laterally (outward) from an outer peripheral portion of the mounting surface portion 52a.

The detection unit 2 is mounted on the mounting surface portion 52a via the bracket 22, and the light source 3 is mounted on the mounting surface portion 52a via the substrate 33. The light source 3 is located in front of the detection unit 2.

A cover 53 is attached to the housing 52 with covering the opening. The cover 53 is formed of a transparent material, has an outwardly concave curved shape, and has lens steps 54, 54, . . . formed on an inner surface of a front half part 53a.

In an internal space 52c of the housing 52, a light shielding plate 55 colored with black or the like, for example, is disposed at a central portion in the front and rear direction. The internal space 52c is partitioned in the front and rear direction by the light shielding plate 55.

An inner surface of the circumferential surface portion 52b of the housing 52 is formed at a rear side of the light shielding plate 55 with a reflection portion 56 configured to reflect the light emitted from the light source 3. The reflection portion 56 is formed by implementing aluminum vapor deposition on a part of the circumferential surface portion 52b, for example.

In the vehicular detection device 51, an outer peripheral portion 53c of the cover 53 is disposed at a position continuous to the side surface part 102 of the vehicle body 101, and the cover 53 is located concave inward relative to the side surface part 102.

In the vehicular detection device 51 configured as described above, the detection light is incident on the detection unit 2 via the cover 53, so that the side area of the vehicle 100 is captured by the detection unit 2.

Also, when the illumination light is emitted from the light source 3, the emitted illumination light is controlled by the lens steps 54, 54, . . . formed on the cover 53, and is irradiated via the cover 53, so that the area ranging from the rear to the side of the vehicle 100 is illuminated. At this time, a part of the light emitted from the light source 3 is reflected on the reflection portion 56 and is irradiated via the cover 54 with being controlled by the lens steps 54, 54, . . . .

As described above, in the vehicular detection device 51, the cover 53 is located concave inward relative to the side surface part 102.

Therefore, it is possible to secure the favorable detection performance and illumination performance while making it difficult for the vehicular detection device to contact the other object.

Also, since the vehicular detection device 51 is provided with the light shielding plate 55, the detection light incident on the detection unit 2 and the illumination light emitted from the light source 3 are shielded by the light shielding plate 55, so that the lights do not influence each other, and it is thus possible to secure the favorable detection performance by the detection unit 2 and the favorable illumination state by the light source 3.

Also, since a part of the illumination light is reflected on the reflection portion 56, it is possible to freely control the traveling direction of the light by a direction and a position of the reflection portion 56, so that it is possible to improve a degree of freedom of design.

Figure 17:
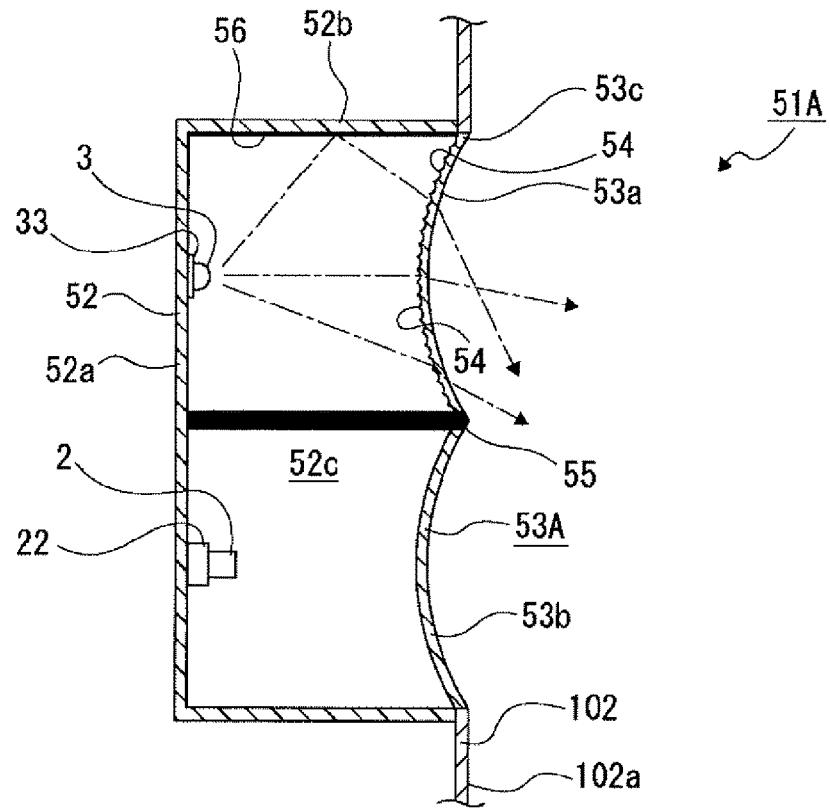
FIG. 17 is a sectional view depicting a modified embodiment of the vehicular detection device of the sixth embodiment.

In the meantime, as a modified embodiment of the vehicular detection device 51, for example, a vehicular detection device 51A having a cover 53A of which a front half part 53a and a rear half part 53b have an outwardly concave curved shape, respectively, may be used (refer to FIG. 17).

Like this, when the front half part 53a and the rear half part 53b are respectively formed to have the curved shape, since the illumination light emitted from the light source 3 is more likely to travel in a direction of spreading outward about the optical axis, as compared to a configuration where the cover is formed to have a planar shape, it is possible to illuminate a wider area. Also, likewise, since the detection light is likely to be incident on the detection unit 2 from an outermore range about the optical axis, as compared to a configuration where the cover is formed to have a planar shape, it is possible to capture a wider area.

Figure 18:
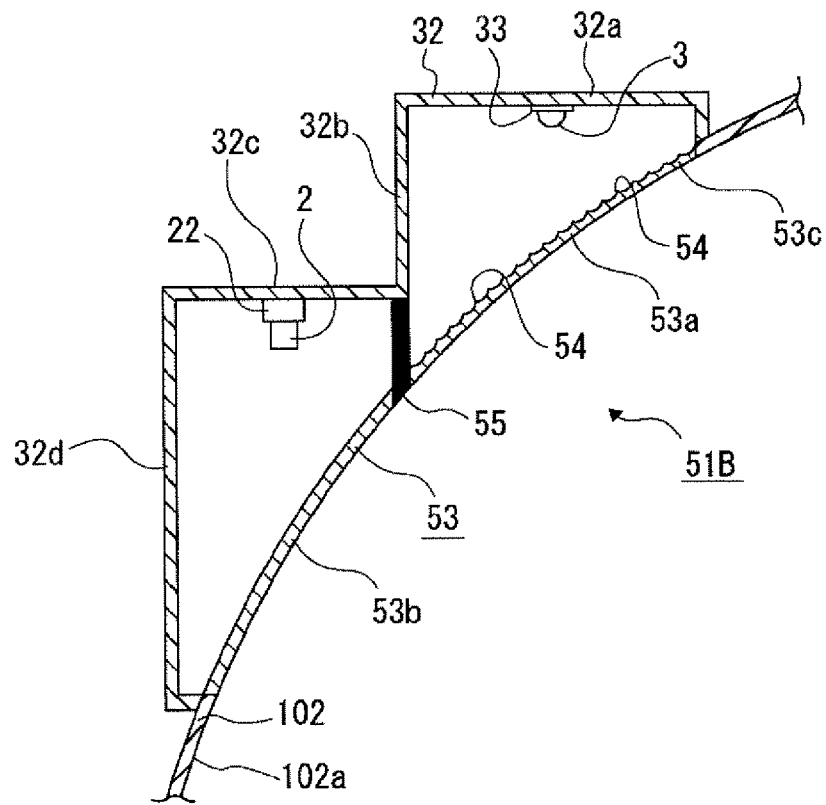
FIG. 18 is a sectional view depicting another modified embodiment of the vehicular detection device of the sixth embodiment.
Figure 19:
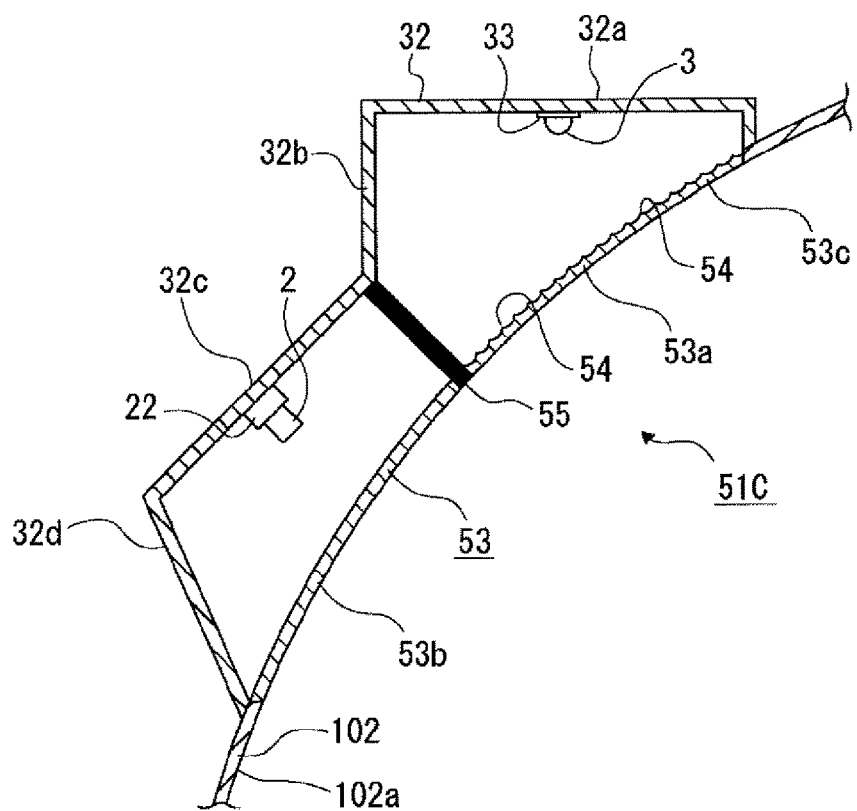
FIG. 19 is a sectional view depicting still another modified embodiment of the vehicular detection device of the sixth embodiment.

Also, as a modified embodiment of the vehicular detection device 51, for example, a vehicular detection device 51B or a vehicular detection device 51C in which the cover 54 is disposed in correspondence to a shape of a fender or the like of the vehicle body 101 may be used (refer to FIGS. 18 and 19). The fender is a part of the vehicle body 101 around a tire, and is a part of the side surface part 102.

The vehicular detection device 51B or the vehicular detection device 51C are respectively provided with the housing 32 having a W-shaped horizontal section, as seen from a lateral direction, the detection unit 2 is mounted on the third surface portion 32c via the bracket 22, and the light source 3 is mounted on the first surface portion 32a via the substrate 33.

The vehicular detection device 51B is disposed in a state where the detection unit 2 and the light source 3 face rearward, for example. The vehicular detection device 51C is disposed in a state where the detection unit 2 faces obliquely rearward and the light source 3 faces rearward, for example.

In the vehicular detection device 51B and the vehicular detection device 51C, the cover 53 is formed to have the same curvature as a curvature of the fender (the side surface part 102), and is disposed continuously to the fender.

Like the vehicular detection device 51B and the vehicular detection device 51C, the cover 53 formed to have the same curvature as the curvature of the fender or the like is disposed continuously to the fender or the like, so that the cover 53 is recognized as being integral with the vehicle body 101 and it is thus possible to improve the appearance.

<Seventh Embodiment>

Figure 20:
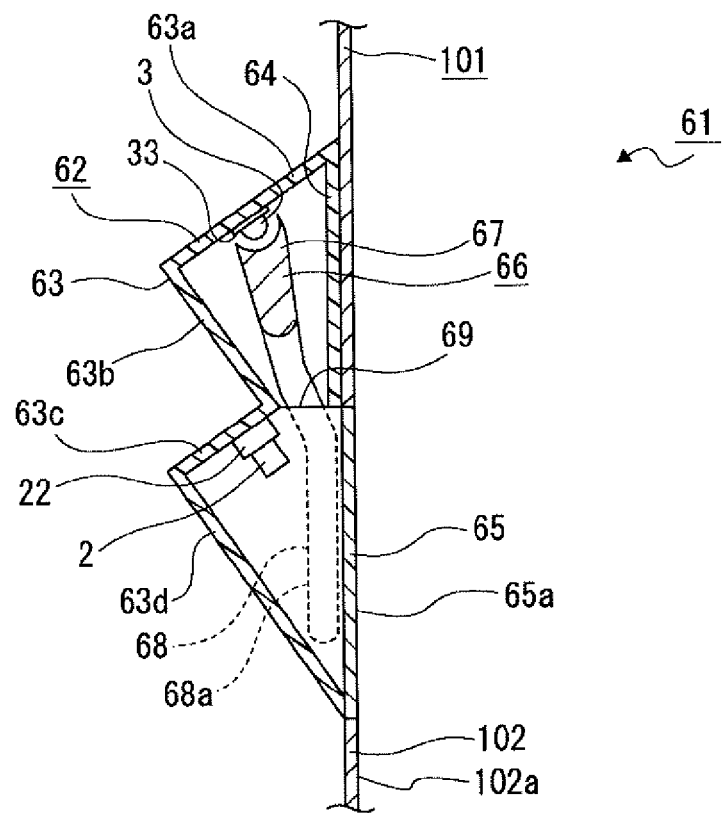
FIG. 20 is a sectional view of a vehicular detection device of a seventh embodiment.
Figure 21:
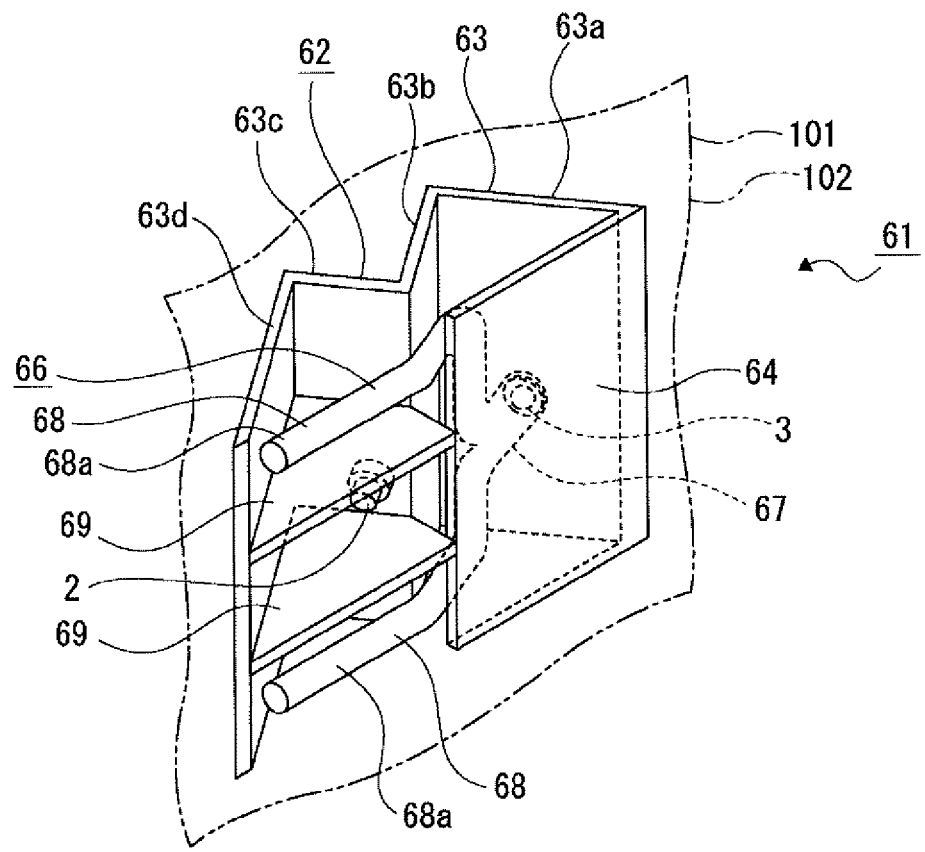
FIG. 21 is a perspective view of the vehicular detection device of the seventh embodiment.

Subsequently, a vehicular detection device 61 of a seventh embodiment is described (refer to FIGS. 20 and 21).

The vehicular detection device 61 includes the detection unit 2 and the light source 3, and the light source 3 and the detection unit 2 are disposed with being spaced in the front and rear direction.

The vehicular detection device 61 has a housing 62. The housing 62 has a main body part 63 having a W-shaped horizontal section, as seen from a lateral direction, and opened laterally (outward), and a wall surface part 64 bent from the main body part 63.

The main body part 63 has a first surface portion 63a, a second surface portion 63b, a third surface portion 63c and a fourth surface portion 63d in order from the front side, which are continuous and are inclined alternately in opposite directions in the right and left direction. The first surface portion 63a, the second surface portion 63b, the third surface portion 63c and the fourth surface portion 63d form the W-shaped part.

The wall surface part 64 has a plate shape facing in the right and left direction, and is located at a side of the first surface portion 63a and the second surface portion 63b.

The detection unit 2 is mounted on the third surface portion 63c via the bracket 22, and the light source 3 is mounted on the first surface portion 63a via the substrate 33.

A cover 65 is attached to the housing 62 with covering the opening. The cover 65 is formed of a transparent material, has a flat plate shape facing in the right and left direction, and is located at a side of the first surface portion 63a and the second surface portion 63b.

In the vehicular detection device 61, a light guide member 66 configured to guide the light emitted from the light source 3 is disposed. The light guide member 66 has a light incidence part 67 located to face the light source 3 and branched parts 68, 68 continuing to the light incidence part 67. The branched parts 68, 68 are branched in the upper and lower direction, and front ends thereof are continuous to the light incidence part 67. The light incidence part 67 and the front end portions of the branched parts 68, 68 of the light guide member 66 are located at a side of the wall surface part 64 of the housing 62, and portions of the branched parts 68, 68 except the front end portions are located at a side of the cover 65.

The portions, which are located at a side of the cover 65, of the branched parts 68, 68 are provided as light emission portions 68a, 68a, and the light emission portions 68a, 68a are located in parallel with each other with extending in the right and left direction.

Light shielding plates 69, 69 are disposed with being spaced in the upper and lower direction between the light emission portions 68a, 68a and the detection unit 2, respectively, so that the detection unit 2 is located between the light shielding plates 69, 69.

In the vehicular detection device 61, an outer surface 65a of the cover 65 is flush with the outer surface 102a of the side surface part 102 of the vehicle body 101. The wall surface part 64 of the housing 62 is located with being in contact with or close to the inner surface of the side surface part 102.

In the vehicular detection device 61 configured as described above, the detection light is incident on the detection unit 2 via the cover 65, so that the area ranging from the rear to the side of the vehicle 100 is captured by the detection unit 2.

Also, when the illumination light is emitted from the light source 3, the emitted illumination light is incident on the light incidence part 67 of the light guide member 66, is guided toward the branched parts 68, 68, is emitted from the branched parts 68, 68 and is irradiated via the cover 65, so that the area ranging from the rear to the side of the vehicle 100 is illuminated.

As described above, in the vehicular detection device 61, the outer surface 65a of the cover 65 is flush with the outer surface 102a of the side surface part 102.

Therefore, it is possible to secure the favorable detection performance and illumination performance while making it difficult for the vehicular detection device to contact the other object.

Also, since the vehicular detection device 61 is provided with the light shielding plates 69, 69, the detection light incident on the detection unit 2 and the illumination light emitted from the light source 3 are shielded by the light shielding plates 69, 69, so that the lights do not influence each other, and it is thus possible to secure the favorable detection performance by the detection unit 2 and the favorable illumination state by the light source 3.

Also, since the illumination light is guided by the light guide member 66, it is possible to freely control the traveling direction of the light by the light guide member 66, and a range of choice for the mounting position of the light source 3 is widened to improve a degree of freedom of design.

In addition, since the irradiation area of the illumination light and the incidence area of the detection light are the cover 65 located at a side of the first surface portion 63a and the second surface portion 63b, a light-transmitting area can be small, so that it is possible to improve the appearance.

In the meantime, the cover 65 may be formed thereon with the lens steps.

<Other Modified Embodiments>

In the below, other modified embodiment of the vehicular detection device is described (refer to FIGS. 22 and 23).

A vehicular detection device 71 of the other modified embodiment relates to an example where when the vehicle body 101 is formed with an emblem 103, the emblem 103 is used as the incidence area and emission area of the light.

Figure 22:
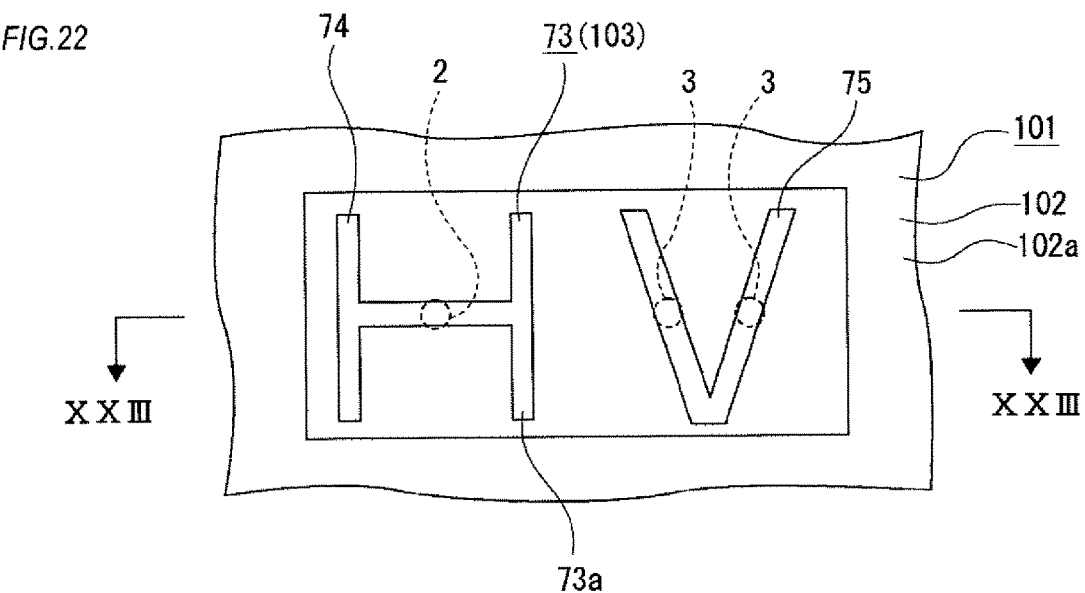
FIG. 22 is a side view depicting another modified embodiment of the vehicular detection device.
Figure 23:
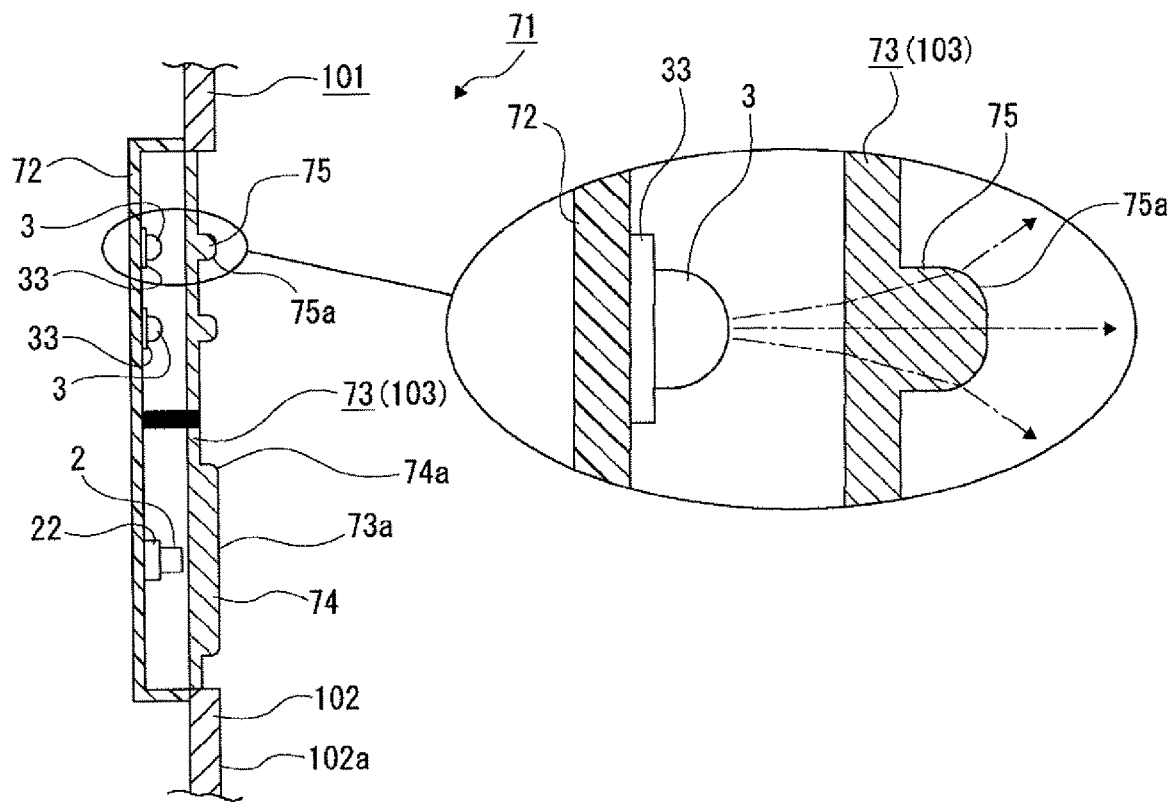
FIG. 23 is a sectional view taken along a line XXIII-XXIII of FIG. 22, depicting another modified embodiment of the vehicular detection device.

The emblem 103 is formed of a transparent material, and is, for example, characters "HV" (refer to FIG. 22). The character "H" and character "V" portions have a convex shape protruding outward, respectively.

The vehicular detection device 71 has a housing 72 and a cover 73, and the cover 73 is formed as the emblem 103 (refer to FIG. 22). Therefore, portions of the cover 73 are formed as the convex shapes 74, 75, which are the character portions. The convex shapes 74, 75 have curved shapes of which outer edge portions 74a, 75a are convex outward.

The detection unit 2 is mounted on the housing 72 at a side of the convex shape 74 that is the character "H" portion, and the light sources 3, 3 are mounted with being spaced in the front and rear direction at a side of the convex shape 75 that is the character "V" portion.

In the vehicular detection device 71, an outer surface 73a of the cover 73 is flush with the outer surface 102a of the side surface part 102 of the vehicle body 101.

In the vehicular detection device 71 configured as described above, the detection light is incident on the detection unit 2 via the cover 73, so that the side area of the vehicle 100 is captured by the detection unit 2.

Also, when the illumination light is emitted from the light source 3, the emitted illumination light is irradiated via the convex shapes 74, 75 of the cover 53, so that the side area of the vehicle 100 is illuminated. At this time, since the outer edge portion 75a of the convex shape 75 has a curved shape, the illumination light emitted from the light source 3 and irradiated from the outer edge portion 75a is likely to travel in a direction of spreading outward about the optical axis, so that it is possible to illuminate a wider area.

Likewise, since the outer edge portion 74a of the convex shape 74 has a curved shape, the detection light is likely to be incident on the detection unit 2 from an outermore range about the optical axis by the outer edge portion 74a, so that it is possible to capture a wider area.

In the vehicular detection device 71, since the cover 73 is formed as the emblem 103, it is possible to save the manufacturing cost by reduction in the number of components.

<Other Examples>

Figure 24:
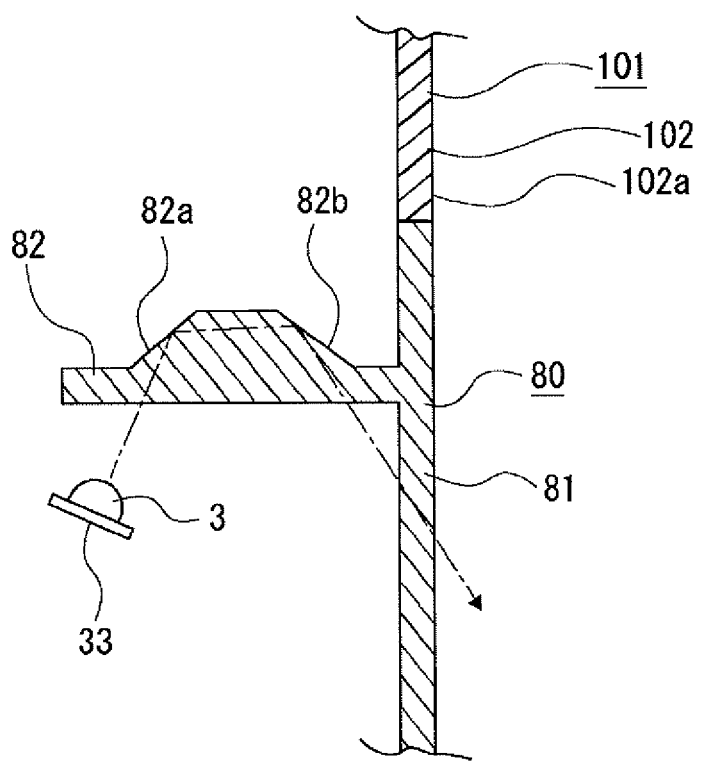
FIG. 24 depicts an example where the cover is provided with a total reflection portion.

In the above, the example where the illumination light emitted from the light source 3 is irradiated as the direct light and the example where the illumination light is reflected on the reflection portion and is then irradiated have been described. However, for example, it is possible to irradiate the illumination light by using total reflection, without using the reflection portion formed by the aluminum vapor deposition or the like (refer to FIG. 24).

As an example, a cover 80 having a cover part 81 configured to close an opening of a housing and a protrusion for reflection 82 protruding from the cover part 81 may be used. The protrusion for reflection 82 is formed with two total reflection surfaces 82a, 82b.

When the illumination light is emitted from the light source 3, the emitted illumination light is sequentially totally reflected (inner surface reflection) on the total reflection surfaces 82a, 82b and is then irradiated via the cover part 81.

By using the cover 80, it is not necessary to form the reflection portion by the aluminum vapor deposition or the like, so that it is possible to easily manufacture the cover 80 and to save the manufacturing cost. Also, it is possible to freely control a traveling direction of the light by directions and positions of the total reflection surfaces 82*a*, 82*b*, so that it is possible to improve a degree of freedom of design.

<Positional Relation Between Side Surface Part and Vehicular Detection Device>

In the below, a position relation between the side surface part 102 of the vehicle body 101 and the vehicular detection device is described.

Meanwhile, in the below, it is described that the vehicular detection device is provided with the cover and the cover is a part located at the outermost part of the vehicular detection device in the right and left direction, and only the side surface part 102 and the cover 90 are shown in the respective drawings.

The outermost part of the vehicular detection device in the right and left direction is flush with or more inward than the outer surface 102*a* of the side surface part 102 in the right and left direction. For example, as described above, there are examples where the outer surface of the prism, the cover or the like is flush with the outer surface 102*a* of the side surface part 102 (refer to FIGS. 2, 4, 5 and the like).

Figure 16:
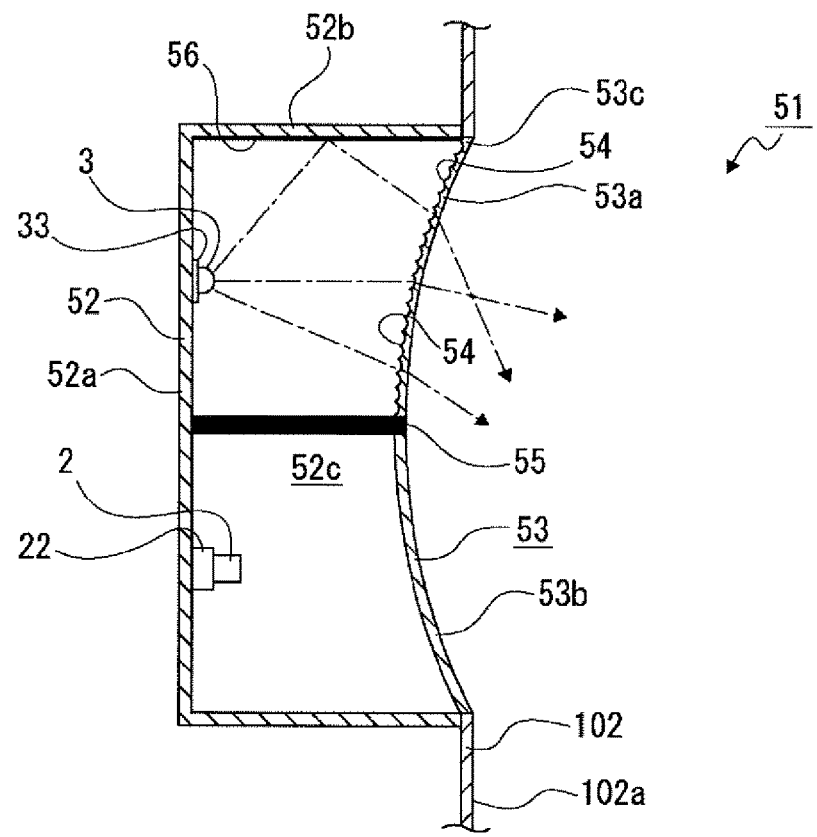
FIG. 16 is a sectional view of a vehicular detection device of a sixth embodiment.

Also, the cover or the like may be formed to have a concave shape, so that the cover or the like may be located more inward than the outer surface 102*a* in the right and left direction (refer to FIGS. 16, 17 and the like).

Figure 25:
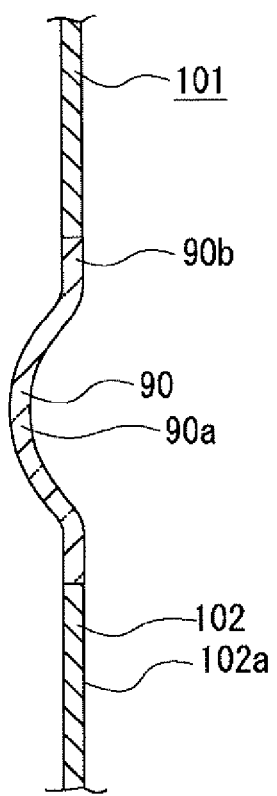
FIG. 25 is a sectional view depicting an example where a part of the vehicular detection device is flush with an outer surface of a side surface part.
Figure 26:
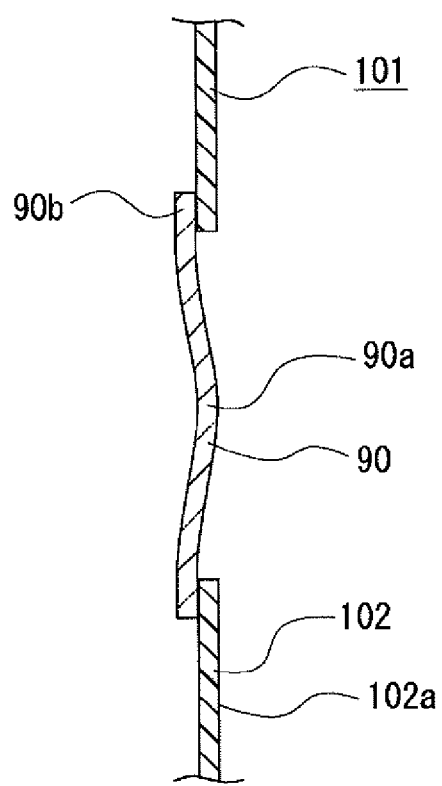
FIG. 26 is a sectional view depicting another example where a part of the vehicular detection device is flush with the outer surface of the side surface part.

Also, for example, as shown in FIG. 25, a part of the cover 90 may be flush with the outer surface 102*a* of the side surface part 102 and the other part of the cover 90 may be located more inward than the outer surface 102*a* in the right and left direction. FIG. 25 depicts an example where a central portion 90*a* of the cover 90 is located more inward than the outer surface 102*a* in the right and left direction and an outer peripheral portion 90*b* of the cover 90 is flush with the outer surface 102*a* of the side surface part 102. To the contrary, as shown in FIG. 26, for example, the outer peripheral portion 90*b* of the cover may be located more inward than the outer surface 102*a* in the right and left direction, and the central portion 90*a* of the cover 90 may be flush with the outer surface 102*a* of the side surface part 102.

Figure 27:
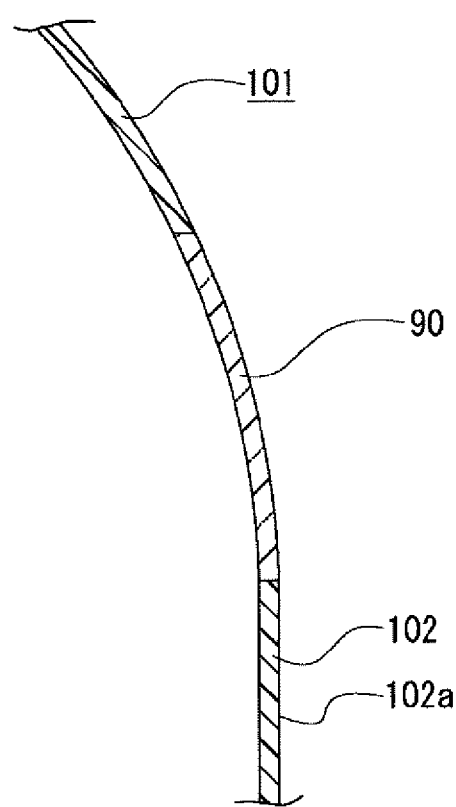
FIG. 27 is a sectional view depicting an example where the vehicular detection device is located continuously to the side surface part having a curved shape.

Also, for example, as shown in FIG. 27, when the side surface part 102 is formed to have a curved shape, the cover 90 may also be formed to have a curved shape so that the cover 90 and the side surface part 102 are to be continuous.

<Summary>

As described above, in the vehicular detection device 1, 1A, 11, 21, 31, 31A, 31B, 41, 41A, 51, 51A, 51B, 51C, 61, 71 (hereinafter, referred to as "vehicular detection device 1 and the like"), the outermost part in the right and left direction is flush with or more inward than the outer surface 102*a* of the side surface part 102 of the vehicle body 101 in the right and left direction.

Therefore, in the vehicular detection device 1 and the like, since there is no part protruding outward from the outer surface 102*a* of the side surface part 102 of the vehicle body 101, it is possible to reduce occurrence of damage by making it difficult for the vehicular detection device to contact other objects, and to improve the fuel efficiency of the vehicle 100.

Also, occurrence of the wind noise is suppressed during the traveling of the vehicle, so that it is possible to secure a traveling state that is comfortable to a passenger in the vehicle.

Also, in the vehicular detection device 1 and the like, at least a part of the surface located at the outer side in the right and left direction may be flush with the outer surface 102*a*. In this case, a concave portion relative to the side surface part 102 does not exist in a provision region of the vehicular detection device 1 and the like or is small even though it exists.

Therefore, the wind passing the outer side of the side surface part 102 during the traveling of the vehicle is difficult to enter the inner side of the side surface part 102, so that it is possible to improve the fuel efficiency of the vehicle as a result of reduction in air resistance, and to suppress the occurrence of the wind noise.

Also, in the vehicular detection device 1 and the like, the entire surface located at the outer side in the right and left direction may be flush with the outer surface 102*a*. In this case, a concave portion relative to the side surface part 102 does not exist in the provision region of the vehicular detection device 1 and the like.

Therefore, the wind passing the outer side of the side surface part 102 during the traveling of the vehicle does not enter the inner side of the side surface part 102, so that it is possible to improve the fuel efficiency of the vehicle as a result of reduction in air resistance, and to suppress the occurrence of the wind noise.

In addition, since the light source 3 or the light source 3D configured to emit the light is disposed in the vehicular detection device 1 and the like, the light source 3, 3D is disposed in the vehicular detection device 1 and the like, in addition to the detection unit 2, so that the vehicular detection device 1 and the like function as a vehicular lamp, too, in addition to the detection device. Therefore, it is possible to improve the functionality.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

100 . . . vehicle, 101 . . . vehicle body, 102 . . . side surface part, 102*a* . . . outer surface, 1 . . . vehicular detection device (vehicular lamp), 2 . . . detection unit, 3 . . . light source, 5 . . . prism for detection, 6 . . . prism for illumination, 6*g* . . . light shielding part, 1A . . . vehicular detection device (vehicular lamp), 11 . . . vehicular detection device (vehicular lamp), 14 . . . light shielding plate (light shielding part), 21 . . . vehicular detection device (vehicular lamp), 31 . . . vehicular detection device (vehicular lamp), 36 . . . light shielding part, 31A . . . vehicular detection device (vehicular lamp), 31B . . . vehicular detection device (vehicular lamp), 41 . . . vehicular detection device (vehicular lamp), 3D . . . light source, 41A . . . vehicular detection device (vehicular lamp), 51 . . . vehicular detection device (vehicular lamp), 55 . . . light shielding plate (light shielding part), 51A . . . vehicular detection device (vehicular lamp), 51B . . . vehicular detection device (vehicular lamp), 51C . . . vehicular detection device (Vehicular lamp), 61 . . . vehicular detection device (vehicular lamp), 69 . . . light shielding plate (light shielding part), 71 . . . vehicular detection device (vehicular lamp)

The invention claimed is:

1. A vehicular detection device to be mounted to a vehicle body, the vehicular detection device comprising:
a device surface to be exposed at a lateral side of the vehicle body when the vehicular detection device is mounted to the lateral side, wherein the device surface does not protrude outwardly of an outer surface of the lateral side when the vehicular detection device is mounted to the lateral side;

a detection unit coupled to the device surface, the detection unit to be disposed inside the vehicle body when the vehicular detection device is mounted to the lateral side, the detection unit having characteristics to detect an object in a detection area ranging from the lateral side of the vehicle body to a rear of the vehicle body when the vehicular detection device is mounted to the lateral side;

a light source coupled to the device surface, wherein the light source is to be disposed inside the vehicle body when the vehicular detection device is mounted to the lateral side, and the light source is configured to emit an illumination light to illuminate the detection area when the vehicular detection device is mounted to the lateral side, wherein the detection unit is positioned to receive a detection light from the detection area when the vehicular detection is mounted to the lateral side;

a first prism having a first surface that forms a first portion of the device surface and a second prism having a first surface that forms a second portion of the device surface, the first prism positioned to receive the illumination light from the light source and direct the illumination light to the detection area through the first portion of the device surface, the second prism positioned to receive the detection light through the second portion of the device surface and direct the detection light to the detection unit; and a light shield disposed between the light source and the detection unit, wherein each of the first prism and the second prism has a second surface, wherein the second surfaces of the prisms are in opposing relation, and wherein the light shield is formed on at least one of the second surfaces of the prisms.

2. The vehicular detection device of claim 1, which comprises a substrate, wherein the light source, the detection unit, and the prisms are mounted on a common surface of the substrate, wherein the first prism has a third surface with a recessed area to receive the light source, and wherein the second prism has a third surface with a recessed area to receive the detection unit.

3. The vehicular detection device of claim 1, which comprises a housing and a cover for the housing, wherein an outer surface of the cover provides the device surface, and wherein the light source and the detection unit are disposed in a space defined between the housing and the cover.

4. The vehicular detection device of claim 3, which comprises a first reflector positioned to receive the illumination light from the light source and direct the illumination light through the cover and a second reflector positioned to receive the detection light passing through the cover and direct the detection light to the detection unit.

5. The vehicular detection device of claim 1, which comprises a cover having an outer surface that forms the device surface and a substrate that carries the light source and the detection unit, wherein the substrate is inclined relative to the cover such that the light source is oriented to direct the illumination light through the cover and the detection unit is oriented to receive the detection light through the cover.

6. The vehicular detection device of claim 1, which comprises a substrate, wherein the light source and detection unit are mounted on opposite surfaces of the substrate.

7. The vehicular detection device of claim 6, which comprises a cover having an outer surface that forms a second portion of the device surface, wherein the first prism is positioned and oriented to receive the illumination light from the light source and direct the illumination light to the detection area through the first portion of the device surface, and wherein the detection unit is positioned and oriented to receive the detection light through the second portion of the device surface.

8. The vehicular detection device of claim 1, which comprises a housing and a cover for the housing, wherein an outer surface of the cover provides the device surface, and wherein the housing has a shape defining a first space in which the light source is disposed and a second space in which the detection unit is disposed.

9. The vehicular detection device of claim 8, wherein a portion of an inner surface of the cover exposed to the first space comprises a plurality of lens steps.

10. The vehicular detection device of claim 9, which comprises a light shield disposed in a location between the first space and the second space.

11. The vehicular detection device of claim 8, which comprises a light guide disposed between the light source and a portion of the cover in registration with the first space.

12. The vehicular detection device of claim 8, wherein the light source is a 3D light source positioned and oriented to direct the illumination light to a portion of the cover in registration with the first space.

13. The vehicular detection device of claim 8, further comprising a light guide member having a main part and branched parts that are in optical communication with the main part, the main part located in the first space, the branched parts extending substantially in parallel to the second space, wherein the main part is positioned to receive the illumination light from the light source, and wherein the branched parts are positioned adjacent the cover to receive the illumination light from the main part and emit the illumination light through the cover.

14. The vehicular detection device of claim 1, which comprises:

a housing having a first mounting area for the light source and a second mounting area for the detection unit; and a cover mounted to the second mounting area, wherein an outer surface of the cover forms a first portion of the device surface;

wherein the light source is a 3D light source and an outer surface of the 3D light source forms a second portion of the device surface.

15. The vehicular detection device of claim 1, which comprises a housing having a first space in which the light source is disposed and a second space in which the detection unit is disposed, a light shield disposed between the first space and the second space, a cover having a first cover portion positioned to cover the first space and a second cover portion positioned to cover the second space, wherein an outer surface of the cover provides the device surface, and wherein a plurality of lens steps are formed on an inner surface of the first cover portion that is exposed to the first space.

16. A vehicular detection device to be mounted to a vehicle body, the vehicular detection device comprising:

a device surface to be exposed at a lateral side of the vehicle body when the vehicular detection device is mounted to the lateral side, wherein the device surface does not protrude outwardly of an outer surface of the lateral side when the vehicular detection device is mounted to the lateral side;

a detection unit coupled to the device surface, the detection unit to be disposed inside the vehicle body when the vehicular detection device is mounted to the lateral side, the detection unit having characteristics to detect an object in a detection area ranging from the lateral side of the vehicle body to a rear of the vehicle body when the vehicular detection device is mounted to the lateral side;

a light source coupled to the device surface, wherein the light source is to be disposed inside the vehicle body when the vehicular detection device is mounted to the lateral side, and the light source is configured to emit an illumination light to illuminate the detection area when the vehicular detection device is mounted to the lateral side, wherein the detection unit is positioned to receive a detection light from the detection area when the vehicular detection is mounted to the lateral side;

a housing and a cover for the housing, wherein an outer surface of the cover provides the device surface, and wherein the housing has a shape defining a first space in which the light source is disposed and a second space in which the detection unit is disposed; and a reflector disposed between the light source and a portion of the cover in registration with the first space, the reflector oriented to receive the illumination light from the light source and direct the illumination light through the portion of the cover in registration with the first space.

17. A vehicular detection device to be mounted to a vehicle body, the vehicular detection device comprising:

a device surface to be exposed at a lateral side of the vehicle body when the vehicular detection device is mounted to the lateral side, wherein the device surface does not protrude outwardly of an outer surface of the lateral side when the vehicular detection device is mounted to the lateral side;

a detection unit coupled to the device surface, the detection unit to be disposed inside the vehicle body when the vehicular detection device is mounted to the lateral side, the detection unit having characteristics to detect an object in a detection area ranging from the lateral side of the vehicle body to a rear of the vehicle body when the vehicular detection device is mounted to the lateral side;

a light source coupled to the device surface, wherein the light source is to be disposed inside the vehicle body when the vehicular detection device is mounted to the lateral side, and the light source is configured to emit an illumination light to illuminate the detection area when the vehicular detection device is mounted to the lateral side, wherein the detection unit is positioned to receive a detection light from the detection area when the vehicular detection is mounted to the lateral side; and a housing and a cover for the housing, wherein an outer surface of the cover provides the device surface, and wherein the housing has a shape defining a first space in which the light source is disposed and a second space in which the detection unit is disposed, wherein the cover is made of a non-transparent material except for a portion of the cover in a line of sight of the light source and a portion of the cover in a line of sight of the detection unit.

18. A vehicle, comprising:

a vehicle body; and a vehicular detection device mounted to a lateral side of the vehicle body, the vehicular detection device comprising:

a device surface that is exposed at the lateral side of the vehicle body when the vehicular detection device is mounted to the lateral side, wherein the device surface does not protrude outwardly of an outer surface of the lateral side when the vehicular detection device is mounted to the lateral side;

a detection unit coupled to the device surface, the detection unit to be disposed inside the vehicle body when the vehicular detection device is mounted to the lateral side, the detection unit having characteristics to detect an object in a detection area ranging from the lateral side of the vehicle body to a rear of the vehicle body when the vehicular detection device is mounted to the lateral side;

a light source coupled to the device surface, wherein the light source is to be disposed inside the vehicle body when the vehicular detection device is mounted to the lateral side, and the light source is configured to emit an illumination light to illuminate the detection area when the vehicular detection device is mounted to the lateral side, wherein the detection unit is positioned to receive a detection light from the detection area when the vehicular detection is mounted to the lateral side;

a first prism having a first surface that forms a first portion of the device surface and a second prism having a first surface that forms a second portion of the device surface, the first prism positioned to receive the illumination light from the light source and direct the illumination light to the detection area through the first portion of the device surface, the second prism positioned to receive the detection light through the second portion of the device surface and direct the detection light to the detection unit; and a light shield disposed between the light source and the detection unit, wherein each of the first prism and the second prism has a second surface, wherein the second surfaces of the prisms are in opposing relation, and wherein the light shield is formed on at least one of the second surfaces of the prisms.

* * * * *